United States Patent [19]

McIntosh

[11] Patent Number: 4,891,764

[45] Date of Patent: Jan. 2, 1990

[54] PROGRAM CONTROLLED FORCE MEASUREMENT AND CONTROL SYSTEM

[75] Inventor: James L. McIntosh, Westminster, Colo.

[73] Assignee: Tensor Development Inc., Westminster, Colo.

[21] Appl. No.: 131,991

[22] Filed: Dec. 11, 1987

Related U.S. Application Data

[63] Continuation-in-part of Ser. No. 805,719, Dec. 6, 1985, abandoned.

[51] Int. Cl.[4] ..................... G05D 17/02; G05D 13/02; G05F 1/10
[52] U.S. Cl. .................................. 364/508; 318/432; 318/594; 364/567; 364/571.03; 388/854
[58] Field of Search ............... 364/506, 508, 511, 513; 318/144, 394, 395, 432, 480, 566, 567, 568, 594

[56] References Cited

U.S. PATENT DOCUMENTS

| | | | |
|---|---|---|---|
| 3,848,467 | 11/1974 | Flavell | 73/379 |
| 3,968,850 | 7/1976 | Gaskill | 177/212 |
| 4,053,742 | 10/1977 | Halase, III et al. | 364/506 |
| 4,278,920 | 7/1981 | Ruoff, Jr. | 318/568 |
| 4,290,000 | 9/1981 | Sun | 318/566 |
| 4,362,978 | 12/1982 | Pollard et al. | 318/568 |
| 4,365,680 | 12/1982 | Gottstein et al. | 177/212 |
| 4,368,412 | 1/1983 | Inoue | 318/568 |
| 4,374,351 | 2/1983 | Fishman et al. | 318/600 |
| 4,375,122 | 3/1983 | Sigmund | 364/508 |
| 4,445,273 | 5/1984 | Van Brussel et al. | 29/714 |
| 4,511,797 | 4/1985 | Pohlig et al. | 318/480 X |
| 4,517,504 | 5/1985 | Honji et al. | 318/568 |
| 4,605,887 | 8/1986 | Boella et al. | 318/594 |
| 4,621,331 | 11/1986 | Iwata | 364/513 |
| 4,621,332 | 11/1986 | Sugimoto et al. | 364/513 |
| 4,625,291 | 11/1986 | Hormann | 364/550 |
| 4,651,290 | 3/1987 | Masaki et al. | 364/550 |
| 4,697,125 | 9/1987 | Goff et al. | 318/567 X |
| 4,741,210 | 5/1988 | Maus | 364/508 X |

FOREIGN PATENT DOCUMENTS 60-254209 5/1984 Japan.

OTHER PUBLICATIONS

A. E. Fitzgerald et al., Electric Machinery, Fourth Edition, (McGraw Hill), pp. 390–392, 398–399.
James D. Foley, "Interfaces for Advanced Computing," Scientific American, Oct. 1987, pp. 127–135.

*Primary Examiner*—Felix D. Gruber

[57] ABSTRACT

A microprocessor based electric actuator control system is provided which allows accurate determination of the forces opposing movement of manipulator driveshaft. The control system electronically sets a predetermined current through an actuator to produce an electromagnetic force. A displacement measuring device, in conjunction with a time clock measures velocity and calculates acceleration of the actuator in response to the current. The force on the shaft is computer varied such that the acceleration is determined. For the acceleration to be zero, the electromagnetic force be exactly balanced by forces equal but opposite in magnitude. Since the force value is determined by the computer, the opposing force is also accurately determined with no external sensing device needed.

25 Claims, 8 Drawing Sheets

PROGRAM CONTROLLED FORCE MEASUREMENT AND CONTROL SYSTEM

The present application is a continuation-in-part of co-pending U.S. patent application Ser. No. 805,719 filed Dec. 6, 1985, and now abandoned.

BACKGROUND OF THE INVENTION

1. Field of the Invention

The invention relates to the control of electric actuators and, more particularly, to the operation of electric motors under programmed current mode control.

2. History of the Prior Art

The basic laws of physics governing the operation and control of electric motors are well known in the prior art. For example, it is a fundamental principle that the flow of an electric current through a magnetic field produces a force. Thus, the relationship which describes the force and/or torque produced by an electric motor may be expressed in general terms as:

$$T = KI;$$

where T is torque, K is a constant determined by the construction of the motor; and I is the current through the motor.

Although this principle is well known, and, moreover, forms the basis for all electric motor design, the techniques for operating electro-dynamic control systems have all followed the same general path. For example, a typical feedback controlled electric motor/actuator includes a variable voltage or current source for driving the motor, a selected performance reference to be achieved (such as position, velocity or acceleration of the motor shaft), and some means to measure the actual performance of the motor (such as position, velocity or acceleration of the motor shaft). The reference value and the measured performance are compared and an error signal is generated based on the difference between them. The error signal is then used to change the voltage or current driving the motor in a direction and value so as to change the motor torque and tend to make the measured parameter performance and the reference value equal and the error signal zero.

Instability is inherent in all conventional feedback control systems. Such systems necessarily include one or more external transducers monitoring the performance parameters of the system. These transducers are almost always analog devices, the output of which is compared with a reference to produce an analog error signal. This error signal is amplified and used to control the motor and drive the error signal toward zero. In all closed loop feedback systems the gain and phase of the error signal must be kept within a specific relationship to the driving signal, to prevent instability and oscillation of the system. The nature of such closed loop feedback systems is that the feedback signal is never in precise synchronism with the driving signal, and further, the degree of lead or lag in the feedback signal is a function of the transfer function of the link between the driving motor and the performance elements being monitored by transducers. All of these consideratios, inherent in conventional closed loop feedback control systems, contribute to potential instability of the system and serve to severely restrict the response time within which such systems can operate.

The relationship between the value of the current flowing in a magnetic field and the value of the force produced thereby has been used for many years to determine either an unknown force or an unknown current. For example, U.S. Pat. No. 3,968,850 to Gaskill and U.S. Pat. No. 4.365,680 to Gottstein et al both disclose weighing systems which measure the current required to generate a force sufficient for balancing the weight of an object. They also include means for damping oscillations to rapidly stabilize the system when a new measurement is being made.

Present current measurement force detection systems conventionally require the accurate sensing of relatively low level analog signals. In an industrial environment, where there is almost always a large component of electrical noise, the precise sensing of such low level signal values is very difficult to achieve in the best of circumstances and impossible to achieve in the worst of circumstances. For example, U.S. Pat. No. 4,564,910 discloses a technique for minimizing error due to noise generated signal fluctuations from a torque transducer, by mechanically smoothing the force function into a series of force signal increments. However, this technique does not address the fundamental problem of accurately measuring low level analog current values in such a high electrical noise level industrial environment.

The system of the present invention adopts a fundamentally different approach to both the conventional measurement of output force parameters with performance transducers, as well as the traditional implementation techniques of closed loop feedback control servomechanism, to effect superior force determinations and control in electrically acutated apparatus. The system of the present technique not only increases the stability of electrical acuator controlled systems but dramatically increases the response time (i.e. speed) within which such systems can operate.

SUMMARY OF THE INVENTION

The system of the present invention includes a method for force determination and control, where the output force of an electrical actuator is not measured, but rather is precisely set by a programmable regulated current source, and only the output actuator shaft displacement is measured as a function of time. The acceleration/deceleration of the output shaft, which occurs because of the action of the total effective force (i.e. the differences between the driving and driven forces) acting upon the actuator shaft, are calculated from both shaft displacement and time measurements, and these data stored in a processor memory. These values of shaft acceleration/deceleration are then used to calculate the value of the effective force acting upon the shaft, which when subtracted from the known set actuator force results in the determination of the total of the heretofore unknown driven forces acting upon the shaft.

Knowing the value of the heretofore unknown driven forces acting upon the actuator shaft, the processor can adjust the actuator current to compensate for said driven forces, in order to set the effective force on the shaft to zero, or to any net value desired. These heretofore unknown driven forces on the shaft comprise all of the time varying forces acting upon the shaft, such as friction, external loads, and even the dynamic response forces of the shaft system itself. Further, if the acceleration of the shaft and the forces acting thereon are known, then the inertial mass of a load on the shaft can be completely determined.

The most common type of implementation of an electrical actuator used in the system of the present invention is that of a conventional DC electric motor. Motor shaft displacement transducers can be electro-optical in nature, which transducers can have very high on-off thresholds and can, thus, be made almost completely immune to electrical noise. The information from these displacement sensors produces an output in a purely digital format and this, together with the setting of the motor current by a programmable regulated current source, totally eliminates the conventional need for measuring low level analog force transducer signals, or motor current measurement signals. These features greatly enhance the accuracy of the means for determining the forces opposing the turning or translation of a motor output shaft.

The accuracy of the system is determined by the number of digital bits required to program the set current value of the current source, the accuracy of the clock upon which calculations are based, and the resolution of the shaft encoder. The required number of current programming bits can be made very large and the resulting inaccuracies, due to the digital nature of the current source, made very small. The measurement errors in the shaft displacement sensors can be made arbitrarily small by increasing the resolution of the displacement encoder code wheel. The timing clock can be made to be very accurate. Although the system of the present invention cannot reach the theoretical accuracy of an analog system, which can theoretically be driven to zero in an infinite number of steps, the accuracy can be made greater than any pre-determined level by increasing the resolution of the programmable variable current source, the displacement resolution of the encoder code wheel, the accuracy of the clock, or all three.

A great advantage of the system of the present invention is the fact that since the force of the actuator is set and not measured, the inherent delay between measuring the force value of the output shaft, deciding if it is correct or in accordance with the desired value, and either shutting down or correcting the actuator is completely eliminated. This allows enormously faster response times as compared to presently used closed loop control systems for the system of the present invention to either control corrections or to detect the occurrence of any system anomaly.

To accomplish the setting of actuator current, and therefore actuator force, and the measuring of output shaft acceleration, a process control microprocessor is used which monitors and stores time varying position displacement pulses from a shaft encoder. The position of the output shaft position encoder can also be monitored by various methods other than optical, including magnetic, mechanical and interferometer methods. The change in position in comparison to a clock timing signal is used to establish a velocity for the output shaft. Velocity values are stored in the microprocessor and subsequent velocity determinations are subtracted from initial velocity determinations and acceleration of the output shaft is thus determined. The programmable current regulator is set by the microprocessor to change the actuator force such as to drive the value of the shaft acceration towards some programmed value which may be either zero or some other value, as determined by algorithms stored within the microprocessor. When the acceleration of the output shaft is zero the effective force acting upon the shaft must also be zero, and thus the forces opposing the displacement of driving and driven forces acting upon the shaft must be equal. This condition determines both the known force which was set by the programmable current regulator and known from prior calibration as well as the unknown force opposing the displacement of the output shaft which must be equal to it.

The computer controlled current source for the motor has second and third order anomalies which may create small errors in the current regulation. Consequently, the system of the present invention contemplates a calibration method to compensate for these errors and to store the value of these errors in a look-up table within the processor to eliminate the effects of said errors during actual operation of the system.

One embodiment of the system employs a three-step method of calibration. First, the processor increases to a preset value the current to the motor with no load on the output shaft so that the shaft accelerates to a preprogrammed constant velocity and the motor output shaft acceleration value is recorded and stored. Next, a calibrated weight is attached to the output shaft of the motor and the acceleration of the motor shaft is measured with the same current setting as before. The difference between two acceleration values and the value of calibrated mass can be used to form the basis for calculations to determine the actual force developed by the motor at the current setting. This current and force value is used as a reference and each current setting for the motor will have an algebraic relationship to this reference. Once the current produced force of the motor is calibrated in this manner, an unknown mass can be determined by measuring the motor shaft acceleration in response to known processor controlled forces produced by the current through the motor.

BRIEF DESCRIPTION OF THE DRAWINGS

For a more complete understanding of the present invention and for further objects and advantages thereof, reference may be had to the following detailed description thereof taken in conjunction with the accompanying drawings, in which.

DETAILED DESCRIPTION OF THE PREFERRED EMBODIMENT

The fundamental operating principle of the force determining and controlling system of the present invention is based upon the physics equation that provided that the torque of DC electric motor is equal to a constant (which constant is determined by the motor construction) times the current through the motor, i.e., $T = K(I)$. This relationship means that the output torque of the motor can be determined by controlling the current through the electric motor. Utilization of this principle in the system of the present invention eliminates the need for servomechanism feedback loops which utilize external sensors to measure the torque actually being produced by the motor shaft and then to utilize that measurement in the motor controller to adjust the motor current and/ or voltage to achieve a desired value of torque.

Figure 1:
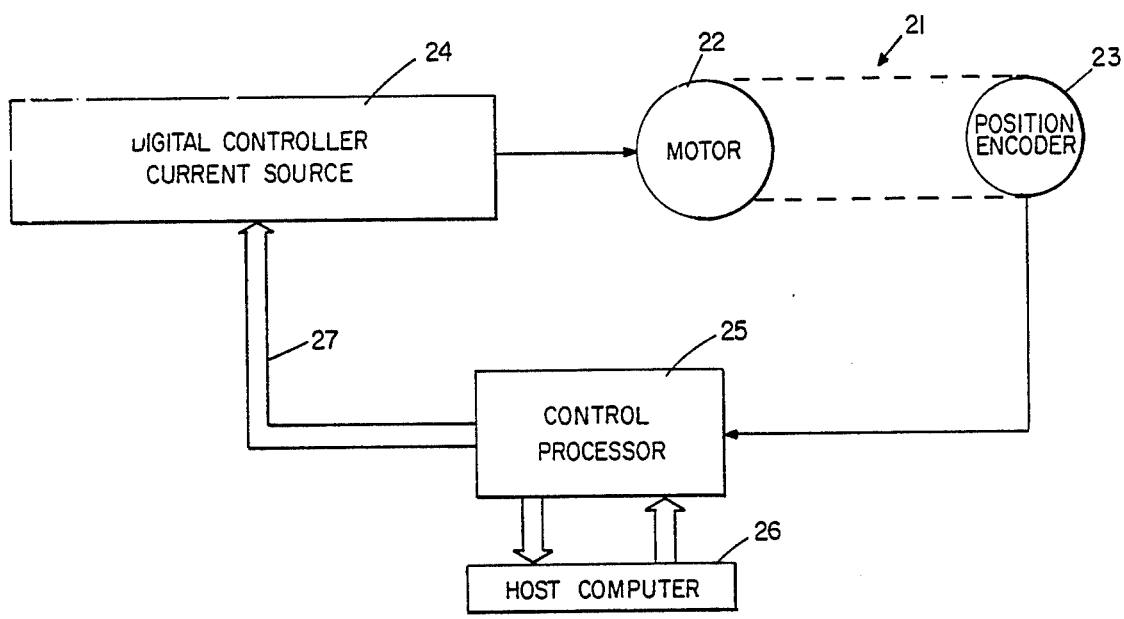
FIG. 1 is an overall block diagram of a system constructed in accordance with the teachings of the present invention.

A preferred embodiment of the system of the present invention is illustrated in the block diagram of FIG. 1. There it is shown that an electric actuator and position encoder assembly 21 can include an electric motor 22 and a rotary position encoder 23. While the rotary form of motor and encoder is illustrated, it should be understood that any form of electric actuator which generates a force as a result of current passing through an electromagnetic field, such as the linear force actuator, could also be employed. In such a configuration, a linear position encoder would also be used.

The position encoder 23 of FIG. 1 may comprise any means for accurately indicating the angular displacement position of a motor output shaft. For example, this might include an optical encoder, a magnetic encoder, or any other means of producing a series of pulses depending upon the angular displacement of the shaft. The position encoder 23 should be located upon the motor shaft as close to the motor as possible to minimize the effects of relative motion due to the elasticity of the mechanical interconnection between the output shaft of the motor and the load. Additionally, the system can be equipped with two position encoders, one adjacent the motor and one adjacent the load. The difference between displacement signal values from the two encoders is indicative of the effects of shaft elasticity and backlash, which effects may be compensated for by the software. Only a single encoder mounted adjacent the motor is discussed herein for purposes of illustrating the basic principles of the system of the invention.

The output signal from the position encoder 23 is connected to a control processor 25 which can take the form of many readily available microprocessor control systems. The control processor 24 constantly monitors the relative angular position of the output shaft of the motor 22 based upon signals from the position encoder 23. The output of the control processor 25 is connected to a digitally programmable controlled current source 24 which supplies a precisely regulated value of current to the windings of the electric motor 22 and, thus, in accordance with basic electrical laws establishes a corresponding value of torque on the output shaft of the motor. The control processor 25 is also connected to the host computer 26 which stores larger blocks of programs and data for use with the control processor and provides coordination and control in accordance with well known principles.

The host computer 26 may comprise, for example, an industrialized version of the IBM PC line of computer products, or one of many other functionally similar computer systems which include a keyboard, a display, and mass memory storage facilities. An RS-232 or RS-488 or other type of interface can be used to communicate programs and store data between the host computer 26 and the control processor 25. Similarly, information from the control processor 25 may be output to the host computer 26 for real times graphics generation and for archival storage purposes.

In the system of FIG. 1, the motor 22 rotates in response to current from the digital programmable controlled current source 24 and moves its output shaft against any load (not shown) which may be connected thereto. As the output shaft moves, the angular displacement position encoder 23 provides periodic digital pulses indicative of the angular distance of movement and rate of rotational translation. Logic within the interface circuitry of the control processor 25 decodes the direction of rotation from the encoder pulses and stores the pulses in one or more counters which forms part of the data register circuitry of the control processor 25. The processor periodically reads at precisely timed intervals the value of the encoder counter. The timed intervals may be set long enough apart such that the transient response of the system is minimized but short enough apart to maintain good resolution of changes in translational angular position. The host computer 26 can change these timed intervals into whatever appropriate units of time are required for a particular use, such as into seconds for generating an output display to the user. However, the control processor 25 utilizes each time increment which is internally selected as a value of one and thus simplifies the velocity and acceleration calculations to be performed by the processor.

The control processor 25 calculates both velocity and acceleration values from time intervals generated by an internal clock and the periodic pulses received from the position encoder 23. Depending upon what task the system is being used to perform, the control processor 25 will write different digital values to the digitally programmable controlled current source 24 via the bus 27. Each distinct digital value read by the current source is translated into a precisely regulated current value which is delivered from the current source 24 to the windings of the motor 22. This set value of current delivered to the motor will generate a precise level of torque or force applied to the load by the output shaft of the motor. By monitoring the acceleration of the output shaft of the motor 22 produced by this preselected force level, the forces opposing the turning of the motor shaft may be very accurately determined. Alternatively, the control processor 25 may be used to vary the current through the motor 22 until the acceleration of the output shaft of the motor 22 is either zero or less than some small preprogrammed value and, therefore, the forces assisting and resisting the turning of the shaft must be equal or nearly equal. As is apparent, for this method of force determination and control to work properly, velocity of the output shaft of the motor 22 must be greater than zero. That is, if the forces resisting the turning of the output shaft, such as friction and inertia plus load, are greater than the forces required to produce rotation, the value of the forces opposing rotation are only known to be greater than the forces trying to produce rotation but not by how much and are thus still unknown.

As can be seen from FIG. 1, the control processor based motor control system allows accurate determination of the forces opposing movement of the drive shaft of the motor 22. The control processor 25 digitally sets a predetermined current value to be delivered by the current source 25 and thus produces a predetermined force at the output shaft of the motor 22. The angular position encoder 23 measures the displacement of the output shaft and enables the control processor 25 to calculate in conjunction with the signals from a clock both the velocity and acceleration of the output shaft of the motor 22.

An alternate method is to install an accelerometer to measure the output shaft accelerations directly instead of using an angular position encoder, a clock and the performance of calculations based upon them. This accelerometer embodiment of the invention lacks the simplicity of the preferred angular position encoder embodiment in that analog signals must be converted into digital signals for the system to operate properly. In addition, the analog signals from the accelerometer must be read against a high level of electromagnetic background noise produced by the motor, and special filtering must be used which may not allow the rapid response time of the preferred embodiment.

The current supplied from the digital programmable controlled current source 24 to the motor 22 is digitally varied in very precise increments by the control processor 25 so that the acceleration of the output shaft of the motor 22 is zero or close to zero. In order for the acceleration of the motor shaft to be equal to zero, the electromagnetic force causing the output shaft of the motor 22 to rotate must be exactly balanced by a force of equal and opposite magnitude in the load on the output shaft. Since the force value is determined by the control processor 25 and is of known value, the opposing force, i.e., an unknown load, is also accurately determined with no external force sensing devices needed.

It can also be seen that the value of the unknown load can be further broken down into the frictional resistance of the motor bearings, the inertial forces caused by the armature and the driveshaft and, if two position encoders are used, the dynamic force caused by elasticity of the driveshaft. Additionally, if the total mass of the moving elements of the system is known the inertial forces thereof can be subtracted from the total forces to determine the value of the unknown forces which are not inertial in nature.

Angular Position Encoder

Figure 2:
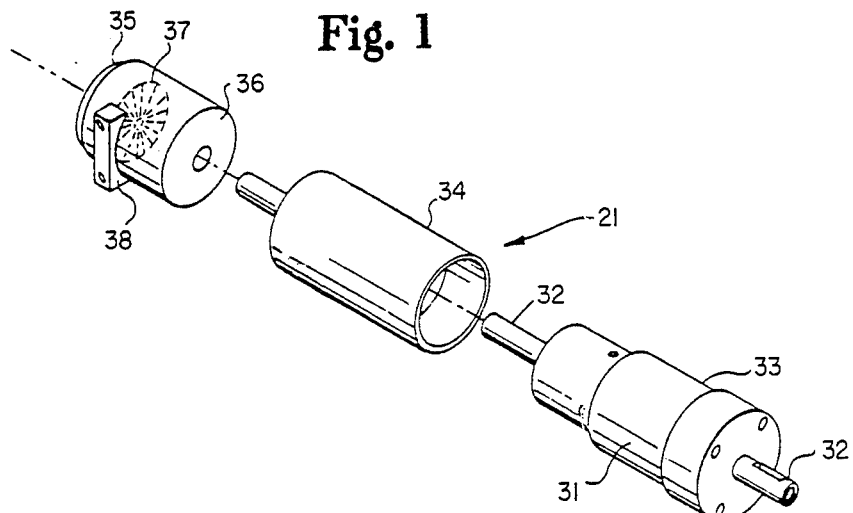
FIG. 2 is an exploded perspective view of a current mode controlled motor assembly included as part of the system of the present invention.

Referring next to FIG. 2, there is shown an exploded perspective view of an encoder and motor assembly 21 used in conjunction with the present invention. As discussed above the position encoder should be mounted on the motorshaft as near to the motor as practical. In applications of the present system where there is essentially no compliance or backlash between the motor and the load, using only one encoder mounted directly adjacent to the motor does not contribute to any significant errors. The exemplary motor and encoder assembly of FIG. 2 is intended for such an application.

The assembly of FIG. 2 includes a permanent magnet DC motor 31 having a rotary shaft 32 extending axially through a cylindrical housing 33 within which permanent magnet field assemblies are located. The motor housing 33 is mounted within a cylindrical shell 34.

The motor assembly 21 also includes a shaft angular position encoder sub-assembly 35 including a housing 36 which axially receives the motor shaft 32 to the end of which is affixed an angular position encoder 37. The angular position encoder 35 includes a mounting flange 38 by means of which the other components of the system may be attached. One embodiment of the shaft angular displacement position encoder 37 is shown in FIG. 3.

Figure 3:
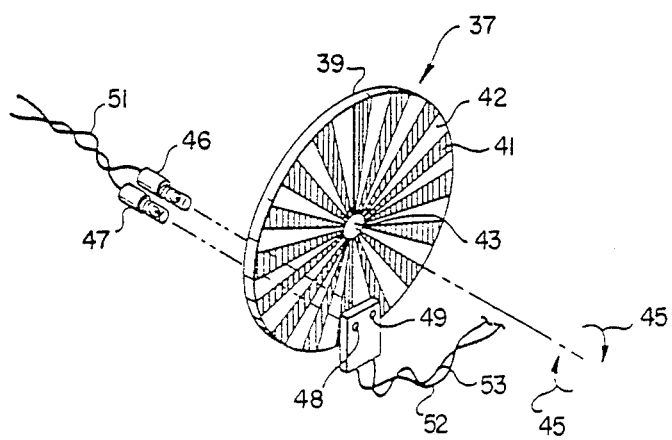
FIG. 3 is an optical position encoder for the motor assembly shown in FIG. 2.

In FIG. 3 there is shown a circular disc 39 having a plurality of radially outwardly extending angularly divided opaque areas 41. Each opaque area 41 is separated by a transparent or open area 42 and the center 43 of the disc 39 is mounted to the end of the shaft 32 of the motor 31. The motor shaft and disc 39 can rotate in either clockwise or counterclockwise directions as is represented by arrows 45. A pair of light sources 46 and 47 are positioned on one side of the disc 39 while a pair of photocells 48 and 49 are mounted in aligned positions on the opposite side of the disc 39. The light sources 46 and 47 are energized via wires 51 so that light passes through the transparent areas 42 and is blocked by the opaque areas 41. As the disc 39 is rotated, pulses are generated by the light sensors 48 and 49 over their respective leads 52 and 53 leading to the control system within the control processor 25. These pulses are stored in an electronic counter in the control system of the control processor 25 which allows it to tell how far and how fast the motor shaft rotating the disc 39 has moved. One of the light sensor 48 is slightly ahead of the other light sensor 49 so that the rotation of the disc 39 in one direction produces a different pulse pattern than rotation of the shaft mounting the disc 39 in the other direction. The lines on the optical encoder disc 39 are preferably formed at 0.1° of arc from one another to provide a very high degree of resolution of the angular position of the shaft 32 of the motor 31. In other embodiments, the angular position encoder for the motor shaft may include other types of angular position sensing means such as Hall Effect devices which sense the movement of a magnetized area and provide similar angular position displacement encoding for the output motor shaft 32 of the motor 31.

Processor Control

Figure 4:
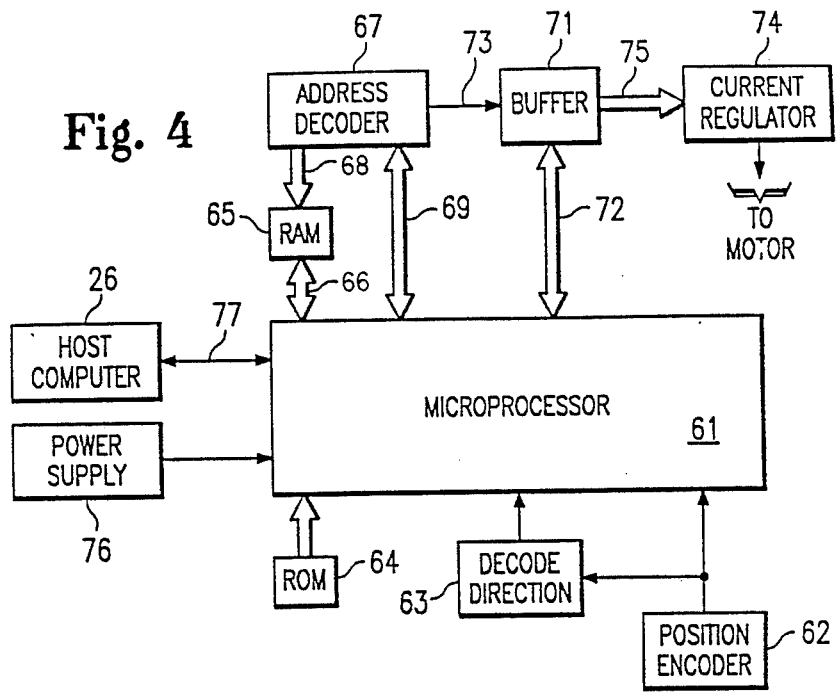
FIG. 4 is a block diagram of the microprocessor controlled elements of one embodiment of the system of the present invention.

Referring next to FIG. 4, there is shown a block diagram of the microprocessor controlled elements of one embodiment of the system of the force determining and control system of the present invention which includes a microprocessor 61 which can comprise any one of a large number of digital processing devices now available. In one embodiment of the system of the present invention a Model Super Z8 Processor manufactured by Zilog was used to substantial advantage. Such a processor may include some of the other elements shown as separate components of the block diagram in FIG. 4, however, these elements may be included as separate components if other processing devices are used to implement the system of the present invention. The microprocessor 61 is connected to receive angular position displacement information from a position encoder data unit 62 and angular direction data from a unit 63. A read-only memory (ROM) 64 provides preprogrammed control data for the microprocessor 61. Similarly, random access memory (RAM) 65 is available to the microprocessor 61 through bus 66 to both store and recall processing information. An address decoder 67 is connected to the RAM 65 through a bus 68 and to the microprocessor 61 through a bus 69. A buffer memory register 71 is connected to the processor 61 through a bus 72 and to the address decoder via data line 73. The contents of the buffer 71 are communicated to the digitally controlled current regulator 74 via a bus 75. The current regulator supplies precisely controlled values of current to the motor.

The microprocessor 61 is in data communication with the host computer 26 via a communication port which may include a conventional communications module such as a RS-232 interface. The power supply 76 is shown to provide separate power for the RS-232 interface included as part of the microprocessor 61 when the Super Z8 is employed or a similar implementation is used.

In general, the microprocessor 61 is in constant communication with the host computer 26 via the RS-232 interface 77 to receive program instructions as well as provide a data storage backup and operator communications link. In some applications, the microprocessor may also operate in a stand-alone mode, and only use a host computer for initial program input. Data stored in the RAM memory 64 sequences the processor 61, as will be further discussed below, to receive position encoder data from unit 62 and decoder direction data from unit 63, and also to perform calculations thereon in order to determine the displacement, velocity, and acceleration of the motor output shaft at periodic intervals. The processor 61 also selects either in accordance with preprogrammed instructions or in accordance with its calculations based upon the position encoder and time data, a digital number, and supplies it through the buffer 71 and the bus 75 to the digitally controlled current regulator 74. This digital number defines a precise value of current which will be supplied by the current regulator 74 to the windings of the motor, and thus establish a precise preselected value of torque to be placed on the output shaft of the motor.

By first setting the value of the current to be supplied to the motor by the current regulator 74, and therefore the torque produced, and then calculating the value of acceleration produced in the output shaft of the motor based upon data from the angular position displacement encoder unit 62, the microprocessor 61 is capable of determining the exact value of the force resisting or assisting the rotation of the output shaft. This concept of using a microprocessor to digitally set a preselected value of current to be supplied to the windings of the motor by the regulator 74, and then using the change in angular displacement of the motor shaft as a function of time to calculate the resistive or assistive torque to the motor shaft, is a fundamental function of the circuitry of FIG. 4. In performing this function, the receipt of information by the microprocessor 61 from the encoder direction data unit 63 and the displacement encoder unit 62 is fundamental.

A specific configuration and operation of the processor control circuitry of FIG. 4 can be divided into six functional blocks including a Super Z8 microprocessor chip 61, the ROM memory 64, the RAM memory 65, a direction logic 63, displacement decoding logic 62, and multiple tristate buffer logic 71. Also included is a $-5$ volt generating chip to power Universal Asynchronous Receiver/Transmitter (UART) within the Super Z8 microprocessor chip 61.

At start up the ROM memory 64 stores data to bootstrap the microprocessor 61 to receive serial data through the UART (included as part of the Super Z8 microprocessor 61) from the host computer 26. These data are input via a direct memory access function of the microprocessor to the RAM memory 65 connected to the microprocessor 61. The shaft direction decoding circuitry 63 sets a counter (also on board the Super Z8 microprocessor 61), to count up or down, depending upon the direction determined by the direction decoding logic 63. The counter accumulates pulses from the displacement decoding logic 62 and values in the counter are periodically read by the microprocessor 61 and stored in its stack registers or memory. The address decoding logic 67 actuates a selected tristate buffer which is connected to the programmable current source 74. At selected times the microprocessor 61 may be polled through the UART to send data to and from the host processor 26. The angular position data is read from the encoder counter 62 and the current data is read to the current regulator 74 to control the torque of the motor.

Figure 5:
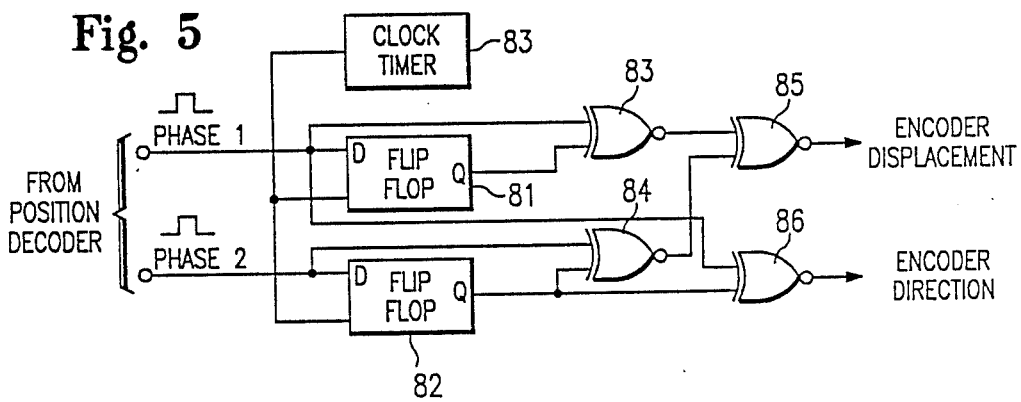
FIG. 5 is a block diagram of the actuator direction and position decoder logic shown in FIG. 4.

Referring now to FIG. 5, there is shown a block diagram of circuitry which may be employed to decode the pulse data as to the direction and angular position of the position encoder. The circuit decodes the angular direction and angular displacement of the motor shaft from the angular position encoder pulses and utilizes that information to cause a counter within the microprocessor 61 to count up or count down for each displacement bit depending upon the state of the direction bit in the decoding logic. A pair of flip-flops 81 and 82 each have one input connected to the output of a clock timer 83. The clock timer may comprise a conventional LM-555 timer while each of the flip-flops 81 and 82 may comprise one half of a 74174 flip-flop. The D inputs of each of the flip-flops 81 and 82 are connected, respectively, to the leads designated 52 and 53 leading from the photocells 48 and 49 of FIG. 3. Thus, the input flip-flop 81 is connected to a phase 1 signal comprising a first train of square wave pulses from the position encoder while the other flip-flop 82 is connected to a second train of square wave pulses, phase 2. The phase 1 pulses are shifted 90° in time from the phase 2 pulses. The Q output of flip-flop 81 is connected to one input of an exclusive NOR gate 83 while the other input thereto is connected from the phase 1 signal. The Q output from the flip-flop 82 is connected to one input of a second exclusive NOR gate 84, the other input of which is connected to the phase 2 input signal. One input of a third exclusive NOR gate 85 is connected from the output of gate 83, while the other input is connected from the output of gate 84. One input of a fourth exclusive NOR gate 86 is connected from the Q output of flip-flop 82, while the other input is connected from the phase 1 input from the position encoder. As can be seen from the circuit diagram of FIG. 5, the flip-flops 81 and 82 and the exclusive NOR gates 83-86 work in synchronism with the pulses of the clock timer 83 and the phase 1 and phase 2 input to decode the encoder direction and encoder displacement. The phase 1 and phase 2 input signals are 90° out of phase with each other and, thus, when one is high and one is low, one of the phases triggers its associated flip-flop into the set state which is communicated through the associated exclusive NOR gates connected to it. Thus, the output of the exclusive NOR gate 86 is either high or low depending upon the angular direction of the encoder. The output of the exclusive NOR 85 displays a one state only when both phase 1 and phase 2 are high or low. This gives a periodic pulse out to the microprocessor 61 which allows it do determine the total angular distance of displacement in 4 increments. Thus, the angular distance of displacement (quadrature decoding) is measured because both exclusive NOR gates 85 and 86 will only be high at the same time every so often. This period depends upon the resolution of the encoder and the velocity of the shaft. For example, in the event that a thousand count resolution is used this would happen every 1/4000 of 360° or 0.09° of arc. Similarly, the output of exclusive NOR gate 86 is provided as a function of the phase difference between the two phase 1 and phase 2 signals and thus provides to the microprocessor 61 an indication of the direction in which the encoder is rotating and, thus, the direction of the angular displacement of the motor shaft.

The quadrature decoding logic described above may also be implemented by an integrated circuit such as the IXSE 501 manufactured by the IXYS Corporation.

Motor Drive Circuit

Figure 6:
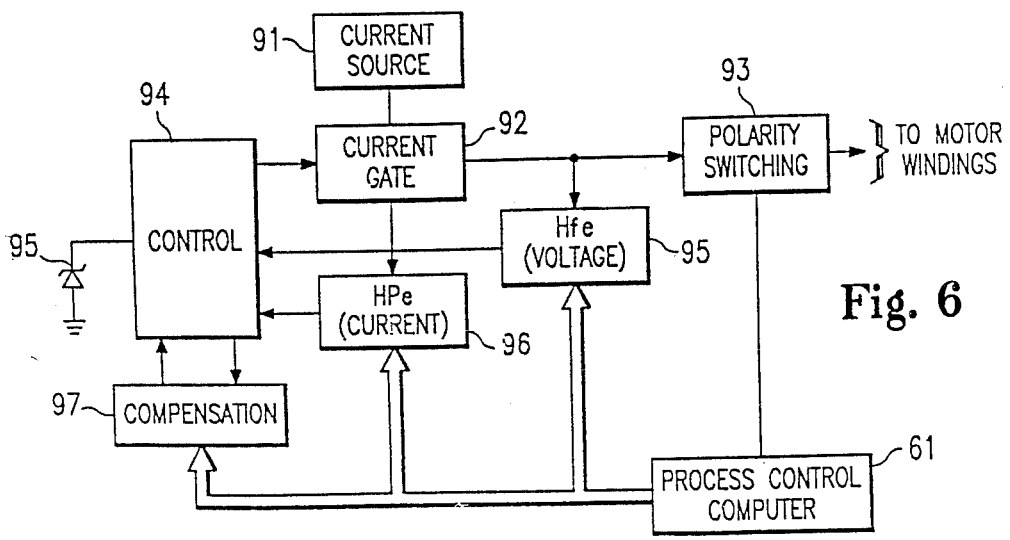
FIG. 6 is a block diagram of a programmable current regulated motor driver circuit used in the FIG. 4 embodiment of the system of the present invention.

Referring next to FIG. 6, there is shown a block diagram of one embodiment of a configuration for effecting a stable current supply for driving a motor in current mode control in accordance with the invention. A source of electric current 91 is connected to supply current through a pass device 92 which couples the current through a polarity switching circuit 93 to the windings of the motor. The polarity switching circuit 93 changes the direction of the current flow through the motor in response to commands from the process control computer 61. The pass device 92 may take a number of different forms including a current gate such as a power switching transistor in a switch mode, or it might include circuitry which would modify the current from the source in some way such as amplifying or degrading it in some fashion. The current gate 92 form of pass device shown operates in response to a control circuit 94 which is connected to a reference voltage 90. The feedback elements of the current control system are divided into three parts: a proportional voltage feedback circuit $H_{fe}$ (voltage) 95; a proportional current feedback $H_{fe}$ (current) 96, and a gain and phase compensation circuit 97. Each of these feedback elements 95-97 operate under control of the process control computer 61 and provide signals to the control circuitry 94 to operate the current gate 92. The proportional voltage control 95 varies the division of the voltage output level, under control of the process control computer 61, and feeds back a selected proportion of the output voltage to the control circuit 94. The proportional current control 96 similarly provides a signal indicative of proportional division of current coming through the current gate 92 back to the control circuit 94, also under control of the process control computer.

The voltage feedback loop and current control loop of FIG. 6 is the only analog feedback employed in the system of the present invention and their uses are limited to within the confines of the motor drive circuit itself. That is, there is no analog feedback control used in the same sense it is employed in traditional servomechanism control systems.

In all feedback regulators compensation of the gain and phase of the feedback signal is required in order to maintain the stability of the regulator. In particular, there is usually employed a fixed value of compensation comprising a capacitor and/or resistors in some manner affixed to the operational amplifier that amplifies the error signal and which controls both the phase and gain of that signal to insure stability. However, when the feedback ratio is changed, a fixed compensation may no longer be ideal for the changed ratio and this can cause the system to become unstable during certain ranges of operation, e.g. when operating conditions vary between high current and low voltage on one hand and high voltage and low current on the other.

The circuitry of FIG. 6 allows the regulator compensation to be varied in accordance with the operating conditions. That is, rather than using fixed compensation in the feedback loop, the present circuitry employs compensation as a dependent variable so that it is optimally varied in such a manner as to maintain the stability of the system. As will be further explained below, one embodiment of the circuitry uses a bank of multiple capacitors and analog switches which are digitally controlled by the process control computer. By switching combinations of the capacitors in and out of the circuit the gain and phase compensation may be varied. The compensation can be varied upon changes in the value of the impedance seen by the regulator, due to changes in the counter EMF of the motor, as well as upon the value of the feedback. All of these potentially encounterable operating conditions are programmed into the process control computer 61 which automatically varies the compensation 97 in accordance with operating conditions. Thus, the system approaches an open loop in terms of stability compensation.

The process control computer switches into the circuit the required values of compensation which have been predetermined to create a stable operating environment based upon the values of current and voltage at any particular time. The system is also responsive to the angular velocity of the motor and the direction of the motor, to determine which bank of resistors and capacitors are used to create the optimum feedback compensation. Of course, whether or not the motor is acting as a motor or generator or an electromagnetic brake is also an important consideration in varying the compensation for optimum performance.

FIG. 6 illustrates a current control system in which current from the source 91 is passed through the current control gate 92 and the polarity switching circuit 93 while portions of the output voltage are proportionally fed back by feedback circuit 95 to the control circuit 94, proportional amounts of the operating current are fed back by feedback circuit 96 to the operating control 94, and the compensation is varied by means of circuit 97 based upon information from the process control computer 61 to provide optimum gain and phase compensation. Each of the feedback elements 95, 96 and 97 are all operated under the control of the process control computer 61 based upon preprogrammed parameters to optimize the operating conditions and control over the current delivered to the windings of the motor.

All of the implementations of a programmable current regulator previously described use analog comparison techniques. By converting the current and voltage sense signals into binary format, it is also possible to use digital feedback techniques to create a programmable current source.

Processor Control

Figure 7:
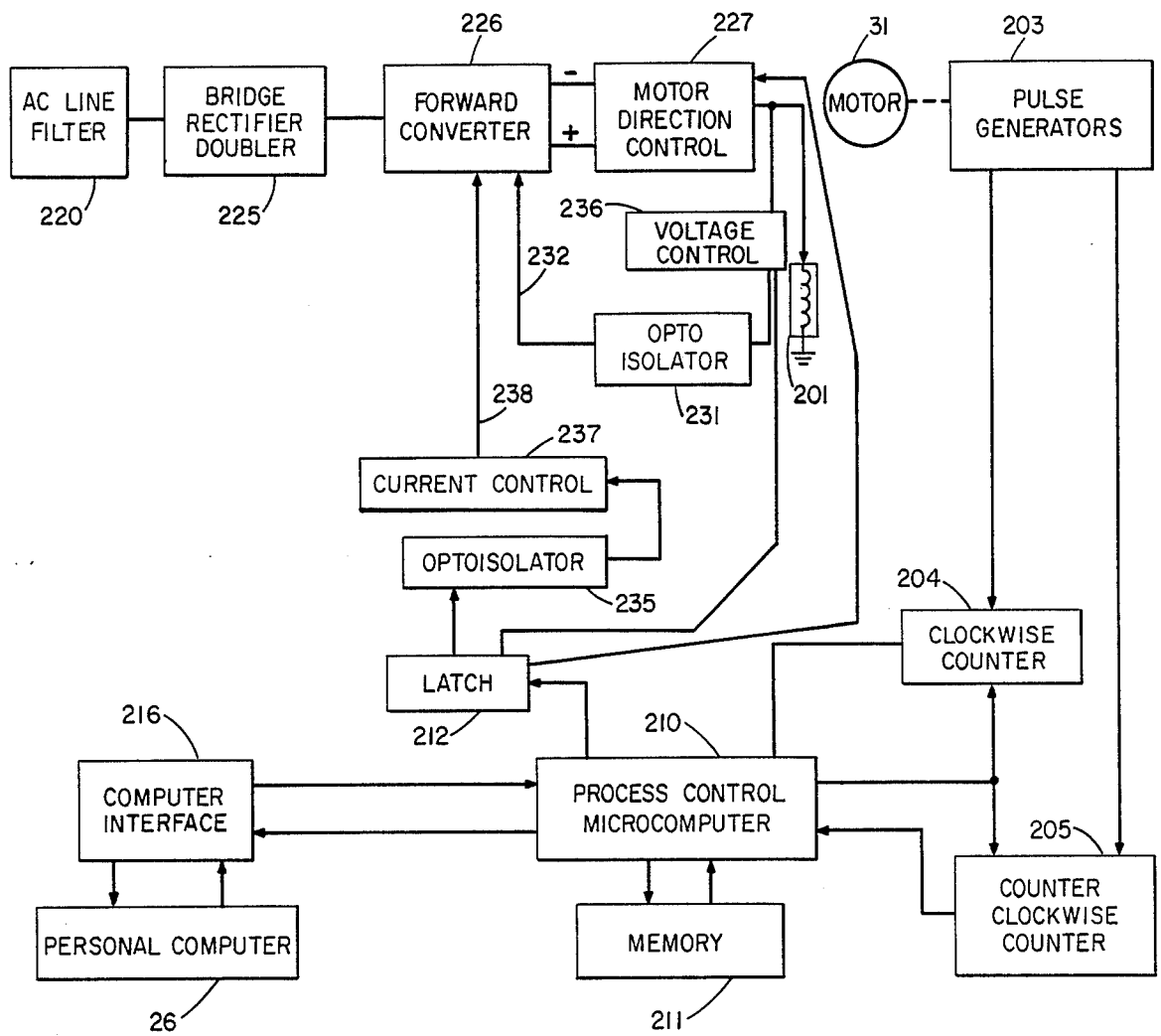
FIG. 7 is a block diagram of the microprocessor controlled elements of another embodiment of the system of the present invention.

Referring now to FIG. 7, there is shown a block diagram of the microprocessor controlled elements of another embodiment of the force determining and control system of the present invention. The permanent magnet DC control motor 31 includes a winding 201 the current flow through which controls the direction of rotation and the torque of the rotor shaft of the motor 31 and therefore the driveshaft coupled thereto. A pulse generator assembly 203 is coupled to the output of the shaft of the motor 31 and serves to generate a train of electrical output pulses as the shaft of the motor rotates. In this embodiment of angular displacement distance and direction determining circuitry the output of the pulses generated by the encoder 203 is connected to a first counter 204 and a second counter 205 which together monitor the angular position and velocity of movement of the shaft of the motor 31. The counters 204 and 205 are connected to each other and to a process control microcomputer 210 which may comprise, for example, a conventional Z8 computer chip such as the model Z8 microcomputer manufactured by Zilog Corporation. The process control microcomputer 210 is also connected to a memory 211 and to latch circuitry 212.

The process control microcomputer 210 is coupled to a host personal computer 26 through a computer interface 216. The host computer 26 may be any one of the type conventionally used for general purpose computer functions. It may be conveniently of the type which is compatible with IBM PC software. The computer interface 216 is preferably of a RS 232 type interface which conventionally interconnects a Z8 microprocessor with IBM PC system compatible software.

The output of an AC line filter 220 is connected to a bridge rectifier/doubler 225 the output of which is connected to a transformer isolated current mode power supply such as a forward convertor 226. The forward convertor 226 includes both a positive and a negative output signal to a motor direction control circuit 227. The output of the direction control circuit 227 is coupled into the motor winding 201. The output of an opto-isolator 231 is fed back through line 232 to the forward convertor 226.

The process control microcomputer 210 is connected through latches 212 the output of which is connected to an opto-isolator 235 and a voltage control circuit 236. The output of the opto-isolator 235 is coupled through a current control circuit 237 to the forward convertor 226 by means of a lead 238.

The process control microcomputer 210 is provided with data relative to the desired torque and speed of the motor 31 from the host computer 26 through the RS 232 interface 216. This information is stored in memory 211 and on command, is output by the microcomputer 210 into the latch 212. Opto-isolators 235 and current control circuit 237 input to the forward convertor 226 an indication of the desired motor torque. Voltage control circuit 236 sets the maximum motor speed which can be developed and is generally set higher than the maximum speed anticipated. Motor direction information is provided to the motor direction control circuit 227 by the output of the latches 212. Actual current through motor winding 201 is set by means of the process control microcomputer 210 via the opto-isolator 231 which provides a current feedback signal over lead 232 to the forward convertor 226 to prevent the current through the windings of the motor from rising above a selected value.

The process control microcomputer 210 receives input from the counters 204 and 205 and based upon the process control software which is also stored in the memory 211. The microcomputer 210 constantly varies the information provided to the latch 212 to provide continuous control over the direction, speed, and torque of the motor as a function of position of the motor shaft as well as the resistance of the load.

Motor Driver Circuit

Figure 8:
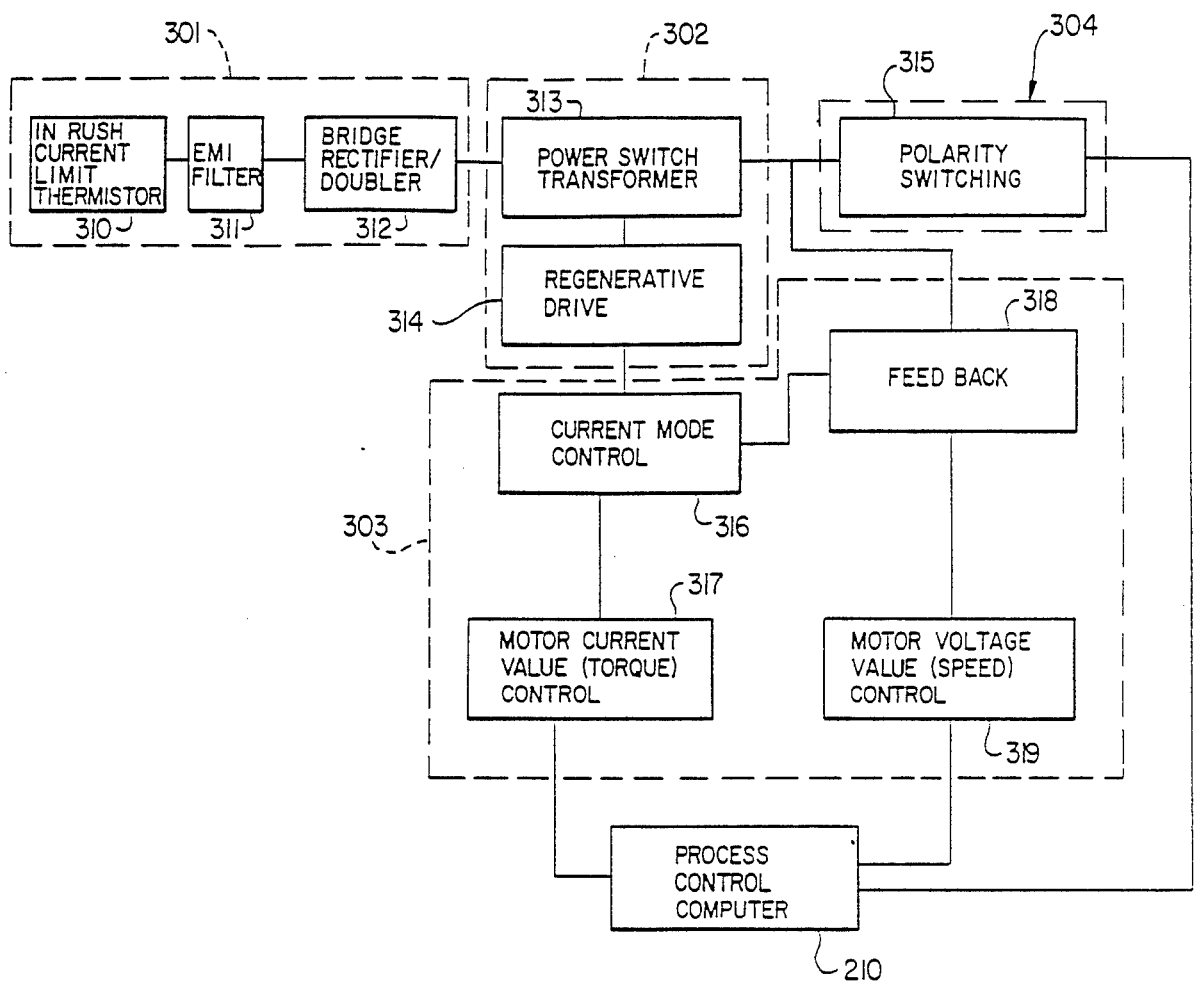
FIG. 8 is a block diagram of a programmable current regulated motor driver circuit used in the FIG. 7 embodiment of the system of the present invention.

Referring now to FIG. 8, there is shown a programmable current regulated motor driver circuit used in the FIG. 7 embodiment of the system of the present invention. This circuitry is a similar embodiment to the motor driver current control circuitry of FIGS. 4 and 6, however, it does not include variable compensation and certain other features included within the embodiment of FIG. 6. Both circuits serve, however, to adequately drive the motor under current mode control and to effectuate the operation of the motor in accordance with the system of the present invention.

The motor driver circuit of FIG. 8 consists of an input section 301, a power switching and output filter section 302, a control feedback section 303, and an output polarity select section 304. The input section 301 consists of an in-rush current limiting thermistor 310, the output of which is connected through an electromagnetic interference filter (EMI) filter 311 into a bridge rectifier/doubler 312. The output of the input section 301 is connected into the power switching and output filter section 302 consisting of a power switching transformer circuit 313 which is connected to a regenerative drive circuit 314. The output of the power switching and output filter section 302 is connected to both an output polarity select 304 which consists of a polarity switching circuit 315 and to a control feed back system 303. The control feedback section 303 comprises a current mode control unit 316 which is connected from the regenerative drive 314 and serves to provide an input to the motor current value control unit 317 which controls the motor torque. The polarity switching circuit 315, as well as the motor current value control circuit 317 and the motor voltage value control circuit 319, are coupled to the process control computer 210.

Within the input section 301, a fuse acts as a safety device which prevents large continuous current such as due to component failure, or to any other condition which cause a high current flow and damage the other circuits. The EMI filter 311 compensates for the power switching section which generates large switching spikes due to rapid turning on and off of high current levels through an induction coil. This switching of currents can cause electrical interferences to be conducted back to the AC line source. The function of the EMI filter is to reduce these voltage spikes to acceptable levels.

The bridge rectifier 312 converts the 60 $H_z$ AC input voltage into pulsating DC and for a standard volt line, the bridge rectifier 212 is configured as a standard bridge giving it output voltage of 1.414×RMS AC line voltage value or approximately 300 volts. For a 125 volt input line the bridge rectifier 312 is configured as a voltage doubler, giving a 2.8×input voltage or approximately 300 volts. The bridge rectifier 312 also includes filter capacitors which convert the pulsating DC from the rectifiers into DC current with some ripple. The power section 302 converts the nominal +300 volts into a positive and negative DC voltage with a maximum peak current of approximately 15 amps and a maximum ±40 volts.

Motor Control Circuit

Figure 9:
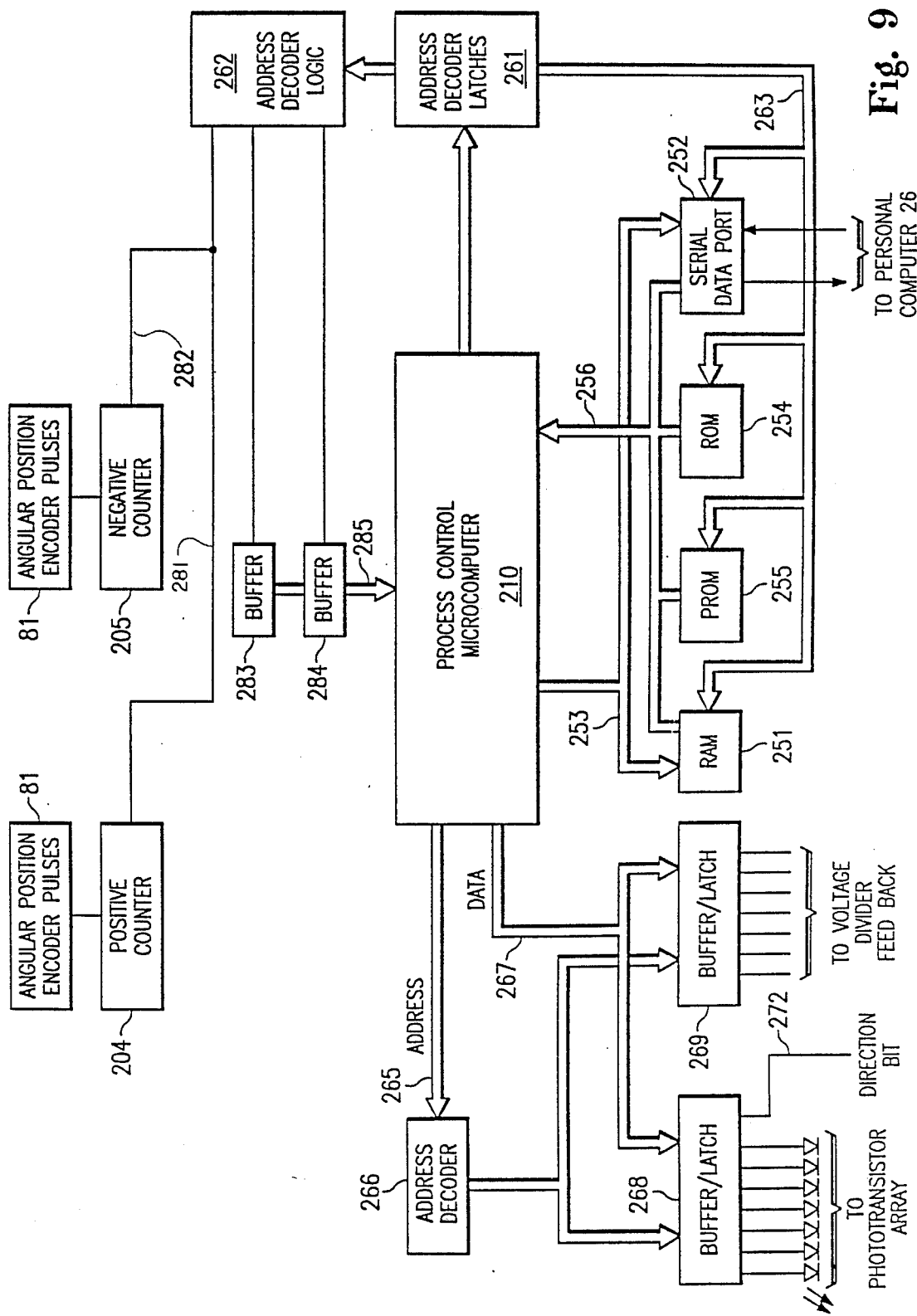
FIG. 9 is a block diagram illustrating a motor control circuit used in the FIG. 7 embodiment of the system of the present invention.

Referring now to FIG. 9, there is shown a block diagram of a digital motor control circuit employed in the FIG. 7 embodiment of the system of the present invention. The process control microcomputer 210 is connected to output digital data to a random access memory (RAM) 251 and to a serial data port 252 by means of an output bus assembly 253. Similarly, the process control microcomputer 210 may receive information from a read only memory (ROM) 254, a programmable read only memory (PROM) 255 and the serial data port 252 by means of an input bus assembly 256. The serial data port 252 may comprise a conventional universal asynchronous receiver transmitter (UART). The serial data port 252 is connected to the host computer 26 used in conjunction with the present invention. The process control microcomputer 210 is also connected to an address decoder latch assembly 261 which is in turn connected through an address decoder logic circuit 262 to the peripheral angular displacement indicators. The address decoder latches 261 are connected by means of a bus 263 to select ones of the RAM 251, PROM 255, ROM 254, and serial data port 252 and for communication with the process control microcomputer 210. It should be understood that one of the components such as the RAM 251, the ROM 254, the serial data port 252 and the address decoder latches 261 maybe included as an integral part of certain microcomputers such as the model Z8.

The microcomputer 210 is also connected by an address bus 265 to an address decoder 266 and by a data bus 267 to a pair of buffer/latches 268 and 269. The address decoder 266 selects which ones of the peripheral units of the buffer/latch 268 and the buffer/latch 269 are enabled for data communication with the microcomputer 210 by means of the data bus 267. The output of the buffer/latch 268 is connected to the phototransistor array associated with the opto-isolator and includes a direction bit coupled over lead 272. The output of the buffer/latch 269 is connected to the voltage divider feedback circuitry.

The peripheral angular position measuring circuits are connected by means of buffers to the process control microcomputer 210. Angular position encoder pulses from the motor shaft position encoder 35 are coupled into a positive counter 204 and a negative counter 205. The data output from counters 204 and 205 are connected via buses 281 and 282 and buffers 283 and 284, respectively, to the process control microcomputer monitor bus 285. The address latches 261 and address logic 262 select which of the buffers 283 and 284 are selected for communication with the process control microcomputer 210 via the monitor bus 285.

Thus, the process control microcomputer 210 receives information from its memory components 251, 254, and 255 as well as the host computer 26 via serial data port 252 and based upon stored programs and information input to it with respect to the motor shaft load monitored over monitor bus 285, provides output control information over output bus 267 to control the direction, speed, and torque of the motor.

Forward Converter Current Control Circuit

Figure 10:
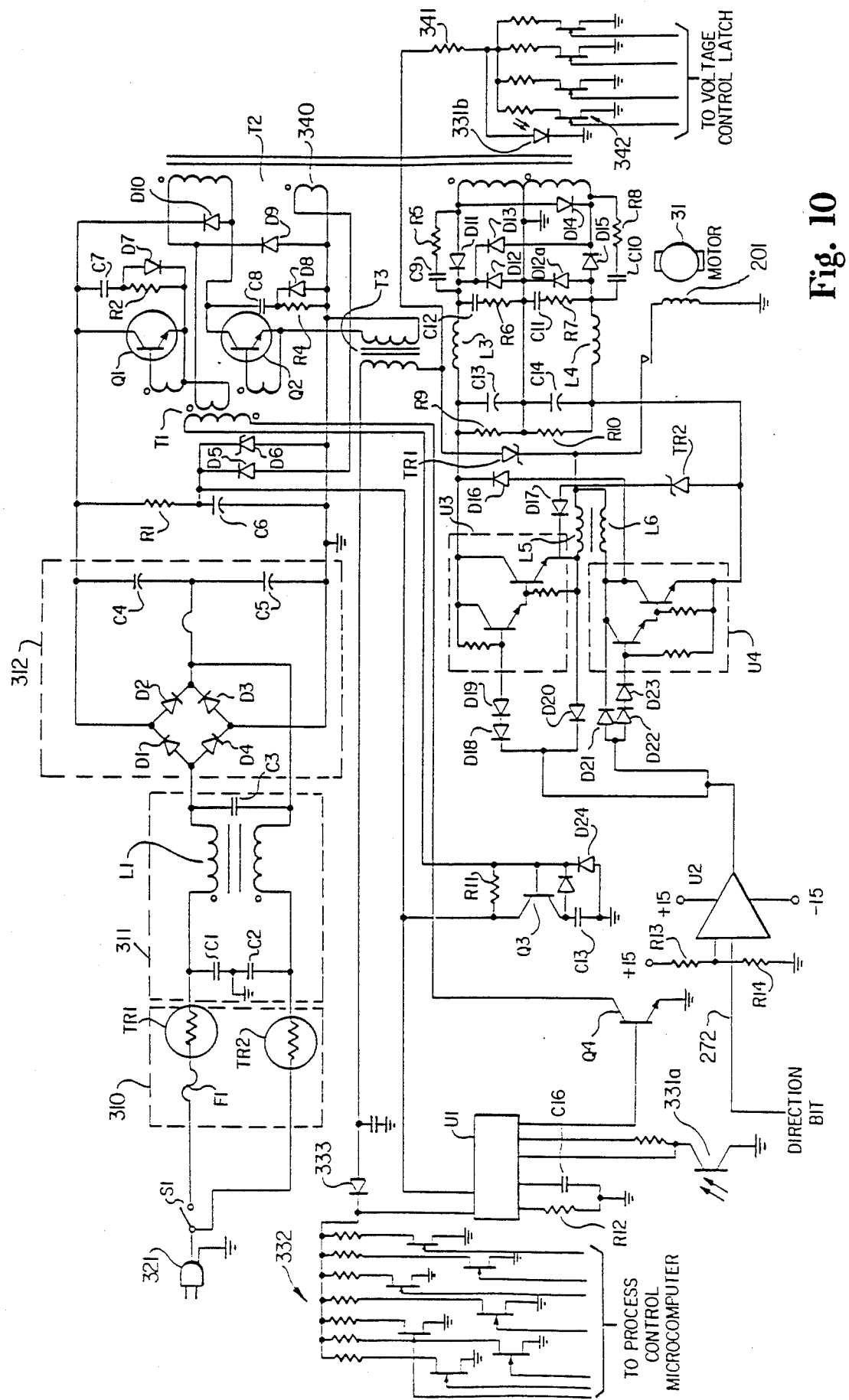
FIG. 10 is a schematic diagram of the motor driver circuit of the motor control circuit shown in FIG. 9.

Referring now to FIG. 10, there is shown a detail schematic diagram of a motor driver circuit of the motor control circuit shown in FIG. 9. The circuit is used to provide current mode control to the DC motor used in the FIG. 7 embodiment of the system of the present invention. This embodiment is particularly useful in applications which do not require a high speed transient response such as in a computer controlled exercise machine. Replacing the bipolar transistors with MOSFET transistors and adding a compensation correction circuit as shown in the embodiment discussed below in connection with FIG. 11, enormously increases the transient response of the system because of the higher switching frequency of the MOSFETS and optimized feedback compensation.

In the circuit of FIG. 10 an AC power source 321 is coupled through a switch S1 into the input of the input current limiting and protection section 310 which consists of a fuse F1 and a pair of thermistors TR1 and TR2, one connected in each side of the line. The output of the current limiting section 310 is coupled to the input of the EMI filter section 311 which consists of a pair of input capacitors C1 and C2 coupled across a common mode choke L1 the output of which has a capacitor C3 connected thereacross. The output of the EMI filter section 311 is connected to the input of the bridge rectifier section 312 consisting of 4 diodes D1, D2, D3, and D4 the outputs of which are connected across a pair of filter capacitors C4 and C5 which provide a rectified and filtered DC signal to the input of the power section. The power section of the motor driver control circuit consists of a power transformer, a regenerative drive and an output filter. The primary power section includes a power transformer T2 and a pair of power transistors Q1 and Q2 which are series connected with the secondary of a regenerative drive transformer T1. A snubber network is connected across the outputs of each of the two power transformers Q1 and Q2 and comprise, respectively, R2, C7, and D7 for the output of Q1 and R4, C8, and D8 on the output of Q2. The emitter of power transistor Q2 is connected in series with the primary winding of a current sensing transformer T3. Flyback clamp diodes D9 and D10 are connected across the windings of the power transformer T2, while input diode D5 and zener diode D6 are connected to the control voltage rail along with input current limiting resistor R1 and start up voltage capacitor C6.

Connected to the output of the power transformer is an array of output rectifier diode D11, D12, D13, D14, and D15. Output rectifier snubber networks R5 and R6 along with capacitor C9 and C12 are connected to one side of the output circuitry while output snubber networks comprising resistor R7 and C11 together with resistor R8 and capacitor C10 are connected to the other side. The positive side of the output circuit is connected through a coil L3 while the negative side of the output is connected through a coil L4 across which are coupled filter capacitor C13 and C14 and minimum load resistors R9 and R10.

The output polarity switching subsection of the power section comprises power hybrids U3 and U4 which are series connected with limiting coils L3 and L4 along with Baker Clamps D18, D19, and D20 for hybrid U3 and D21, D22, and D23 for hybrid U4. Freewheeling diodes D16 and D17 are connected across the power hybrids U3 and U4 which may comprise respectively, for example, models 645 and 646 Darlington hybrids, made by Unitrode. A phototransistor 331a of the opto-coupler circuitry, the photodiode of which is shown at 331b is coupled through the current mode control chip U1, which may be a model 1846 manufactured by Unitrode. A direction bid lead 272 from the buffer latch (272 of FIG. 9) is connected to the input of a power operational amplifier U2 the other input of which is set at a voltage level by voltage dividers R13 and R14.

The control section of the motor driver circuit of FIG. 10 consists of the secondary of the current sensing transformer T3 which produces a voltage representative of the current through the primary and is connected to the input of the current mode control chip U1 through the diode 333. The ratio of the voltage going to the control chip U1 is controlled by variable burden resistor network 332. The gates of the field effect transistors of the variable burden network 332 go to the phototransistor array connected to the buffer/latch 268 of FIG. 9.

The chip U1 has a timing resistor R12 and a timing capacitor C16 connected thereto. A transistor Q4 is connected to the chip U1, the output of which is connected across the secondary of the regenerative drive transformer T1.

The current mode power supply of FIGS. 8, 9 and 10 is transformer isolated and the safe relatively low output going to the motor windings 201 is completely electrically isolated, with respect to DC current, from the dangerously high line voltage at 321 by the phototransistor array and the opto-isolator 331a-331b.

The motor driver circuit of FIGS. 8, 9 and 10 includes modified two transistor forward convertor which operates at a nominal switching frequency of 40 KH$_Z$ and which produces a maximum of plus or minus 40 volts and plus or minus 15 amps to the current winding 201. Power coupled through switch S1 passes through fuse F1 and into thermistors TR1 and TR2. When the AC current is first applied, the AC filter capacitors C1 and C2 act like a dead short and produce a very large current surge until they are charged. Since thermistors TR1 and TR2 are cold they have a very high resistance and limit this inrush of current. As the current continues to flow through the thermistors TR1 and TR2 they heat up, decrease their resistance and, thus, limit the start up current but do not dissipate a large amount of power during normal running conditions. The filter section consisting of filter capacitors C1, C2, and C3 and inductance L1 serves to limit the amount of electrical interference coupled back into the AC line source due to the rapid switching on and off of large values of current through an inductor in the power switching section. The EMI filter 311 reduce these current spikes to acceptable levels. The rectifier/doubler 312 which consists of diodes D1, D2, D3, D4, and output filter capacitors C4 and C5 convert the 60 Hz line current into pulsating DC the output of which is approximately 300 volts for both a 220 volt input as well as a 125 volt input line.

The power switching section converts the nominal plus 300 volt rail voltage into a positive and negative DC voltage with a maximum peak current of 15 amps and a maximum plus or minus peak voltage of 40 volts. This circuit is composed of 3 subsections a primary side switching section, a regenerative drive section, and an output rectifier filter. The primary side switch ignition consists of power switching tansistors Q1 and Q2 which are connected in series with the primary of power transformer T1. The DC rail voltage is converted to pulses by switching these transistors simultaneously completely on and completely off. By controlling the ratio of the time on to the time off, i.e. the duty cycle ratio, the ratio of input voltage to current on the one hand to output voltage to current on the other hand can be precisely controlled since changing the duty cycle ratio has the same effect as changing the turns ratio of a transformer.

In order to reduce the peak voltage seen by the power transistors Q1 and Q2 the two are connected in series so that peak voltage rating requirements for each one are reduced in half. The flyback voltage when the power transformer T2 resets is returned to the DC rail by flyback clamp diodes D9 and D10. At start up, power from the DC rail is current limited by R11 and capacitor C5 stores enough energy to power the regenerative drive until the voltage from the primary transformer auxiliary winding 340 is sufficient to power the primary side of the control circuit.

The snubber networks, C7, D7 and R2 connected across power transistor Q1 and R4, C8, and D8 connected across power transistor Q2 protect the power transistors during the turn-on and turn-off thereof thereby preventing inductive spikes from exceeding the safe operating limit of the transistors. The regenerative drive subsection of the power section of the motor driver circuit of FIGS. 8 and 10 operates so that when the driver transistor Q4 is on, the power transistors Q1 and Q2 are off. The magnetizing current in the control winding of the regenerative drive transformer T1, approaches a limiting vlaue equal to the control circuit voltage divided by the current limiting resistor R1. Capacitor C13 is discharged at this time. The only voltage on any winding of the regenerative drive transformer is due to wire resistance. When the output from the control chip U1 becomes high, the driver transistor Q4 turns off and the energy stored in the inductance of regenerative drive transformer T1 causes a flyback voltage to be developed on all windings of the transformer T1. This voltage momentarily forward biases the base-emitter diodes of the power transistors Q1 and Q2, and collector current starts to flow. The collector current value divided by the turns ratio of the regenerative driver transformer T1 also flows to the base of power transistors Q1 and Q2. The ratio of base current to collector current set by the turn ratio of the drive transformer T1 is slightly more than the minimum beta of driver power transistors Q1 and Q2. Thus, once turned on, the current through Q1 and Q2 rapidly increases until these transistors are completely turned on. During the time that the power transistors Q1 and Q2 are on, control transistor Q4 is off, and current through R11 and R1 is multiplied by the gain of transistor Q3 rapidly charging capacitor C13. At the end of the on period, the control circuit turns off which in turn turns on drive transistor Q4 applying the voltage stored in the capacitor C3 to the regenerative drive transformer T1 driving the bases of power transistors Q1 and Q2 sharply negative. This negative voltage on the base of power transistors Q1 and Q2 turns both of them rapidly off as the turn-off current pulse is much larger than the base current through the transistors Q1 and Q2. Thus, turn-off time is very rapid.

When the power transistors Q1 and Q2 are off, no base current flows, and any remaining voltage from capacitor C13 flows through the regenerative driver transformer T1 adding to the energy stored in the transformer inductance. The diode D24 prevents driving the upper end of the regenerative driver transformer negative. After start up, the power transistors Q1 and Q2 are alteratively switched on and off in a manner described above until source power is removed.

The output from the secondary of the regenerative drive transformer is centertapped and produces an output voltage/current of equal amplitude but of opposite polarity. Diodes D11 and D15 are forward biased when the switching power transistors Q1 and Q2 are on. Current flows through these diodes and the filter inductors L3 and L4 so that the voltage across these inductors is positive thereby reverse biasing the free-wheeling diodes D12 and D13. When the power switching transistors Q1 and Q2 turn off, the voltage developed by the secondary of the output power transformer T2 reverses polarity as the transformer resets. The diodes D11 and D15 are then reversed biased and the voltage across filter inductors L3 and L4 also reverses polarity forward biasing the free-wheeling diodes D12 and D13 and thus, allowing current to continue to flow in the inductors. The snubber networks R5, C9, and D11 in one side of the secondary and R8, C10, and D15 in the other side prevent large inductive spikes from occurring due to diode transition times.

The output voltage from the secondary of the power transformer T2 is smoothed by filter capacitor C13 and C14 while minimum load resistors R9 and R10 provide a minimum load resistance and thus prevent switching noise from charging the output filter capacitors to a damaging level and, further, allow a minimum current to flow through filter inductors L3 and L4.

Two special zener diodes TR1 and TR2, known as transorbs, are specifically designed to fail to a shorted condition, should the voltage across them rise above a specified level, i.e. 40 volts. These diodes guarantee that not potentially hazardous voltages are developed on the secondary, and hence, user accessible, side of the power transformer for applications where such is required.

The output voltage from the forward convertor of FIG. 10 is determined by the ratio of the time the power transistors Q1 and Q2 are on, as compared to the time they are off. The control section precisely sets this ratio on a cycle-by-cycle basis 40,000 times per second allowing very precise control of the peak output voltage and peak output currents. The control section of the circuitry of FIG. 10 uses what is known as current mode control which consists of a primary feedback loop which senses the current through primary of power transformer T2 and a secondary loop which senses the output voltage on the secondary of power transformer T2. The specialized current-mode control chip U1, incorporates an oscillator, power transistor drivers, a current sense comparator, a feedback voltage operational amplifier, and a precision voltage reference.

The operation of the current sensing loop is such that when power transistors Q1 and Q2 are on, current flows through the primary of the power transformer T2, the regenerative drive transformer T1 and the current sensing transformer T3. Because of the inductance in these transformers, the current will ramp in a linear fashion and be divided in a 200 to 1 ratio by the current sensing transformer T3. This current is then rectified by the diode 333 and converted into a voltage by controllable burden resistor network which consist of field effect-transistor resistor pairs 332. Depending on the binary combination of the state of these seven transistor/resistor pairs, the burden resistance of the current sense transformer T3 is computer control, thus allowing an adjustable limit to 1 of 128 different levels. When the voltage level representing the inter-current loop reaches the reference voltage value, a comparitor causes the output drivers of control chip U1 to change state and power transistors Q1 and Q2 are latched off until the internal clock of the control chip U1 turns them back on again. The control chip oscillators are configured so that if the output transistors are not turned off before the duty ratio reaches 50 percent, then the chip switches them off automatically thus allowing all transformers to be properly reset.

The peak output voltage from the motor driver circuitry of FIG. 10 is controlled by a second feedback loop opto-isolated from the primary control section. The feedback consists of the output voltage divided by a computer controlled voltage divider network. The output of this voltage divider network is set at the level of the voltage reference contained in the control chip U1. By changing the ratio of these resistors, the peak output voltage can be changed. The ratio of this network resistance is computer controlled by having a fixed resistor 341 in a series with parallel combination of series connected resistor field-effect transistor combinations the resistance of which depends upon the binary combination of the state of the resistor/field effect transistor network 342. The effective ratio of the voltage divider network is controlled by the process control computer. If the output voltage which is fed to the primary circuit through an isolation network rises above the reference voltage at the noninverting input of the feedback operational amplifier contained in U1, the output of this amplifier will be driven to a lower level which is determined by the gain of the operational amplifier. This voltage is used as a reference voltage for the intercurrent loop comparator. If the current limit section does not allow full output voltage to be reached at the current level desired, then the reference voltage will be left in its highest level.

In the output polarity switching section, the convertor generates a plus and minus nominal 40 volts. The direction of the motor torque is determined by which polarity from the convertor is selected. This is accomplished by power operational amplifier U2 powered by a plus and a minus 5 volts from an auxiliary power supply turning on Darlington hybrid circuits U3 and U4, depending on whether the direction bit on lead 272 from the control computer is high or low. Diodes D18 to D23 form Baker Clamp circuits allowing fast switching response of the Darlingtons. Coils L5 and L6 limit current spikes during cross conduction time. The diodes D16 and D17, which are part of the Darlington hybrids U3 and U4 are free-wheeling diodes which prevent inductive turn-off voltage spikes due to the high inductance of the motor field winding coil 201.

Thus it is seen that the process control microcomputer 210 maintains very precise control over the polarity, voltage and current of the signal which is delivered to the winding 201 of the motor 31. this enables the computer to precisely vary the torque of the motor and make precise changes therein so as to conform to the requirements of the program as well as the responses of the load as the system is operated.

High Speed Current Control Circuit

The above discussion of the motor control circuitry was an implementation of the system of the present invention employing a forward converter and relatively slow bipolar switching transistors. Alternative implementations are possible utilizing other current control devices such as either linear regulators or switch mode regulators, including a buck regulator, a flyback regulator, a half bridge regulator, a full bridge regulator, a boost regulator, and combinations thereof.

Figure 11:
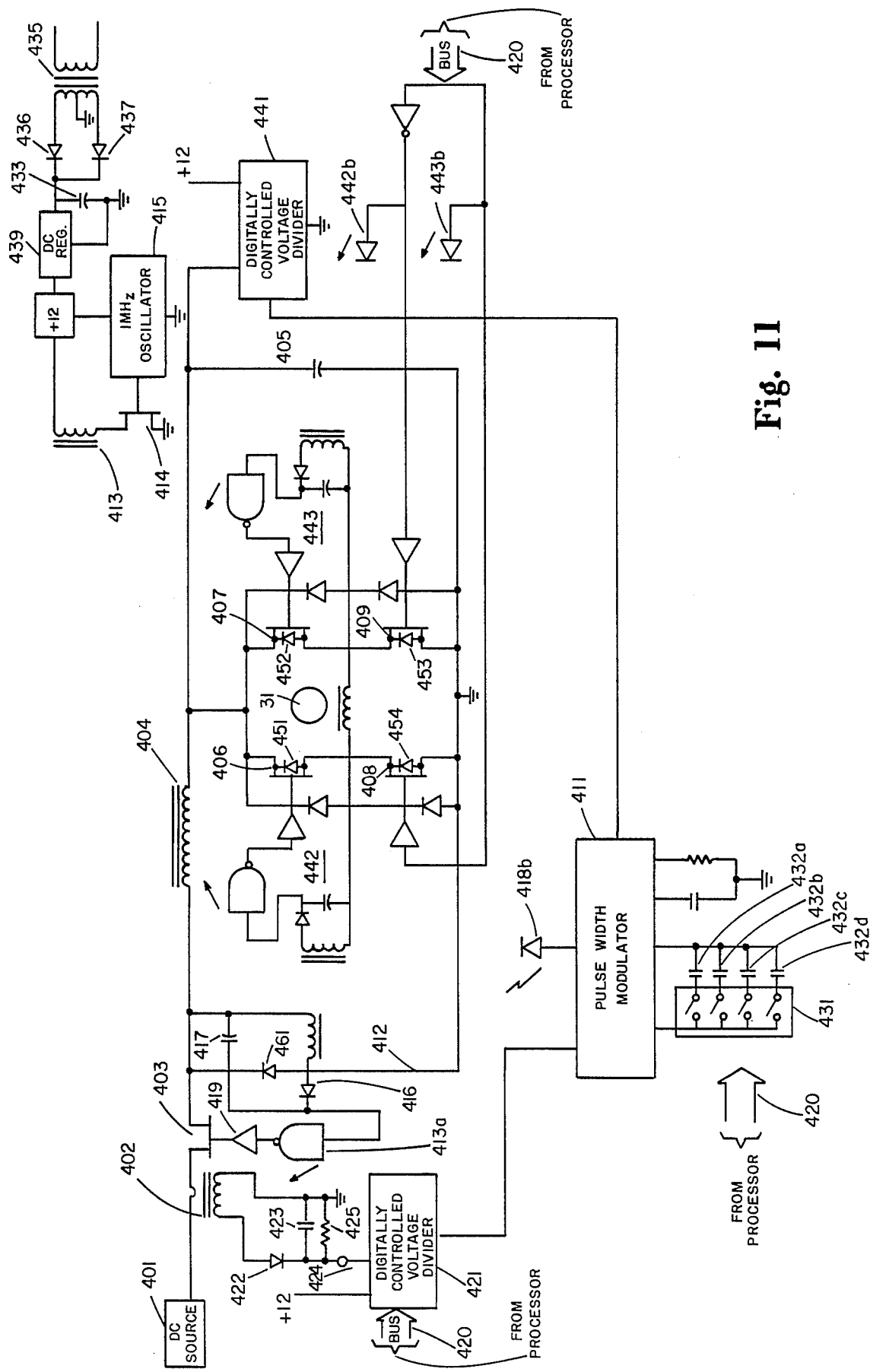
FIG. 11 is a schematic diagram of a motor driver circuit for the FIG. 4 embodiment of the system of the present invention.

In FIG. 11 there is illustrated a current mode control motor drive circuit for the FIG. 4 embodiment of the system of the present invention as implemented with a buck regulator, high speed MOSFET switching transistors and variable feedback compensation. The current regulator includes a DC voltage source 401 connected through the primary of a current sense transformer 402 into a regulator switch 403 comprising a MOSFET transistor. The source 401 is series connected to a small filter inductor 404 and is connected in parallel with a filter capacitor 405. The line inductor 404 and the capacitor 405 are also connected to a bridge circuit comprised of MOSFETS 406, 407, 408 and 409 and then to ground. Selected diagonal pairs of MOSFETS 406-409 are simultaneously turned on in accordance with the state of a signal from the processor control computer. Depending upon which pair of MOSFETS is turned on, the direction of current through the motor 31 is thereby determined by the process control computer. A conventional delay circuit (not shown) may be incorporated such that all four transistors of the bridge are never turned on simultaneously.

Regulating MOSFET transistor 403 is turned on and off by signals generated by a control circuit which may comprise an integrated pulse width modulator 411 which may be, for example, a Model UC-3842PWM IC manufactured by Unitrode Corporation. A voltage referenced to the drain of MOSFET 403 is generated by a transformer secondary 412 the primary side of which, 413, is connected to a +12 volt source and driven by another MOSFET transistor 414 and a 1 MHz oscillator 415. The current passing through the secondary winding 412 is rectified by a diode 416 and filtered by a capacitor 417. An opto-coupler 418a, such as a 6N137-1 opto-coupler, turns on a driver amplifier 419, such as a 4050 driver, which then turns MOSFET transistor 403 on and off in accordance with the signal from the pulse width modulator 411. The operation of the pulse width modulator 411 is such as to provide current mode control in accordance with a typical buck regulator application of power MOSFETS. The detailed operation of such circuits is described in Application Note U-100 for the UC-3842 Integrated Pulse Width Modulator, published at pages 220-231 of the Unitrode Corporation Application Manual and is incorporated by reference herein.

The output voltage from the pulse width modulator control chip 411 is connected to the photo-diode portion 418b of the opto-coupler 418a. The high side of the opto-coupler 418a is connected through an amplifier 419 to the gate of pass transistor 403 to turn it on and off. The outputs from the digitally controlled voltage dividers 421 and 441 are connected to the inputs of the pulse width modulator chip 411. This device, may comprise, for example, a Model PM-7524 8-Bit Buffered Multiplying D/A Converter manufactured by Precision Monolithics, Inc. and configured as a voltage divider with digitally controlled gain, as set forth in FIG. 9 of the Precision Monolithics Data Book (pages 11/150-11/158) (1/86 Rev. A), and is incorporated by reference herein.

Generally speaking, this device controls the proportional division of an input voltage in accordance with a received digital signal to produce a fractional value of the input voltage as its output. the value of the input voltage to the digitally controlled voltage divider 421 is proportionally divided in accordance with a signal received on the bus 420 from the process control computer. This proportionally divided voltage is output to the pulse width modulator control chip 411, which controls the PWM ratio of the MOSFET transistor 403.

Current sense signals are developed by the transformer 402. The current from source 401 through the transformer 402 is stepped down in direct relationship to the turns ratio of that transformer, for example, 100 to 1. A diode 422 rectifies this current, and a capacitor 423 and a ferrite bead 424 form a filter network to eliminate the capacitive spike caused by the initial turn-on of MOSFET 403. The resistor 425 converts the rectified current into a voltage which is directly proportional to the current flowing through the transformer 402. The value of this voltage is ratio-metrically controlled by the digitally controlled voltage divider 421 in accordance with the digital signals from the process control computer via bus 420. Depending upon the division ratio set by the digitally controlled voltage divider 421, the output of the PWM control chip 411 is varied through the opto-coupler 418a-b to control the peak current flowing through MOSFET 403. Thus, that peak current is controlled by the process control computer. Since the peak current sets the ratio of the time-on to the time-off of MOSFET 403, and also the RMS value of the current through the motor 31 this current is thereby controlled by the microprocessor.

As the voltage and/or current feedback loops are varied by the microprocessor, and, depending upon whether the motor 31 is serving as a motor or as a generator, the compensation needed for maximum transient response varies. An analog switch 431 which may include, for example, a Model 4066 Analog Switch made by Motorola, controls a series of capacitors 432a-432d which can be preferentially switched in or out of the circuit by the signal on the bus 420 which controls the state of the analog switch 431. Thus, the processor signal changes the feedback compensation to allow maximum transient response of the system with good stability margins under varied operating conditions of the motor 31.

A separate power supply generated by conventional means including a step-down AC transformer 435, rectifying diodes 436 and 437, a filter capacitor 438 and a linear regulator 439 is used to power the digitally controlled voltage dividers 421, 441 and the analog switch 431 as well as to generate drain referenced voltages for all of the MOSFET transistors where the drains are not referenced to ground, i.e. MOSFET 403, 406 and 407. MOSFET transistors 406 and 407 are driven on and off by the same method described above for 403 under control of their respective opto-coupler control circuits 442 and 443.

Diodes 451-454 allow current flow around the steering MOSFET transistors 406, 407, 408 and 409 such that if the transistors are not simultaneously switched on or off, the inductive energy in the motor coil cannot form a dangerously high voltage spike which could destroy the MOSFET transistors.

Diode 461 allows current to flow through inductor 404 when MOSFET regulator transistor 403 is off. During this period inductor 404 sources current. When regulator transistor 403 is on, current flows from the voltage source 401 storing energy in inductor 404 as well as providing energy to the motor 31. The ratio of time when the inductor 404 sources current to the time when the inductor 404 stores power determines the total amount of current, averaged over time, flowing through the motor 31.

It should also be noted that other types of current regulation schemes could be used to generate a precisely controlled current for driving a motor in accordance with the teachings of the present invention. For exaple, in the above referenced Application Note U-101 of Unitrode Corporation, pages 234–242 and entitled "200 KH$_z$ Current-Mode Converter Provides 500 W: there is shown a centered-tap push-pull topology operating with a continuous inductor current in current mode control. In this system the current regulating scheme uses an artificially generated ramp instead of the current flow through the motor. The steering transistors themselves are ratio-metrically controlled directly, and no external chopping transistor such as MOSFET 403 of FIG. 11 is used.

In addition, there is also availble a chip from the S.G.S. Corporation which controls the voltage or current in response to bi-directional analog signals through a motor. This chip is a two quadrant controller with current limit, rather than current control. The digital signals from the process control computer must first be converted into analog signals by a digital to analog converter in order to implement this chip.

The above discussions relate to embodiments of the invention which include a current regulator. It is also possible to use digital current measuring techniques instead of a regulator to precisely determine the current through the motor for a given period of time. The purpose of the current regulator is to provide a known current for a known period of time for each given binary number output by the process control computer. This allows precise determination of force to binary number. It is also possible once the mass of the shaft and rotor or system mass is accurately determined by some method, to establish a table which relates a measured value of current to a measured value of force as described above.

Using this current measuring embodiment of the invention, unknown forces opposing or resisting the driveshaft of the motor may be calculated as a function of measured current, rather than a set force as described above. It is not possible, using current determining techniques, to precisely set a level of force output by the motor, but only to measure such force. Therefore, this embodiment will not accomplish all of the advantages set forth in the invention utilizing a current regulator, such as both determining and setting forces on the motor shaft, dynamic calibration, and greatly increased system response time. In cases where these advantages are not needed, current determining techniques may be adequate.

Operation Calculations

As is briefly set forth above, the accuracy with which the system of the present invention can measure a force of opposition to the angular movement of the motor shaft is dependent upon the dynamic calibration of the system prior to operation. In particular, the system must be run through a standard calibration routine in which a number of parameters are evaluated and used to build look-up tables within the memory of the microprocessor and/or host computer to enable a selected evaluation of current, force, mass, velocity and/or acceleration during the operation of the system.

In general, the technique used for calibration is that the system is first run through a setting of a plurality of selected values of current through the windings of the motor with no external load on the shaft. For each of the different values of set current, successive values of shaft angular displacement as a function of time are measured and used to calculate velocity and acceleration. Thereafter, these data comprising a plurality of associate values of current and acceleration of the motor shaft with no external load are stored in the table. Next, a mass of known value is affixed to the operating shaft of the motor and the process of successively setting a plurality of selected current values while measuring the periodic displacement of the operating shaft as a function of time, is effected so that corresponding values of velocity and acceleration may be measured and calculated with a known load. Thereafter, the system stores said plurality of associated values of current and acceleration of the shaft when loaded by the known mass.

Next, successive values of shaft acceleration with no load are subtracted from the corresponding successive values of shaft acceleration with the known load. Both sets of successive values were previously stored and the difference value is now stored. For each value of acceleration difference calculated, the net force produced on the shaft of the motor is calculated for each preselected value of current. The system then stores in a look-up table each of the net force values in association with a corresponding binary number which establishes a set current value.

The calibration routine of the system next employs the setting of successive values of current through the windings of the motor with the motor shaft fixed to an unknown load. The system successively measures the angular displacement of the actuator with the unknon load affixed thereto as a function of time and calculates therefrom successive values of velocity and acceleration. Thereafter from a table of current, time, displacement, velocity and acceleration, and by use of the basic Newton's Law, Force=Mass times Acceleration (F=MA), and data taken from the previous tables of force with a known mass as a function of current through the windings of the motor, the program selects a particular force corresponding to the current measured. Thus, the unknown force is equal to the looked-up force for the measured current for the selected value of acceleration chosen.

The force produced by setting a known value of current through the motor is also affected by the motor temperature. Using the above described methods to determine the force output by the motor for each binary number at selected motor temperatures allows an additional error table to be established for correction of force differences as a function of temperature. For example, the rotor of the motor may be stalled and a high current put through the windings to raise the temperature of the motor. Thereafter, the shaft is released and the output force of the motor measured in accordance with the above produces at a plurality of selected discrete temperature values and a fixed current. These data are then stored in a correction table for motor temperature to be used by the processor in its calculations.

With these data stored, a dynamic force measurement can be made of a shaft under load by fixing successive currents through the windings of the motor and measuring the acceleration of the shaft for the current set. Thus, with known accelerations, known forces (set currents), and known masses, it is clear that:

$$F_{total} = F_{set\,force} + F_{unknown} = MA$$

Thus:

$$F_{unknown} = F_{total} - F_{set}.$$

In this way, the system can use the unknown force to control function operations.

Figure 12:
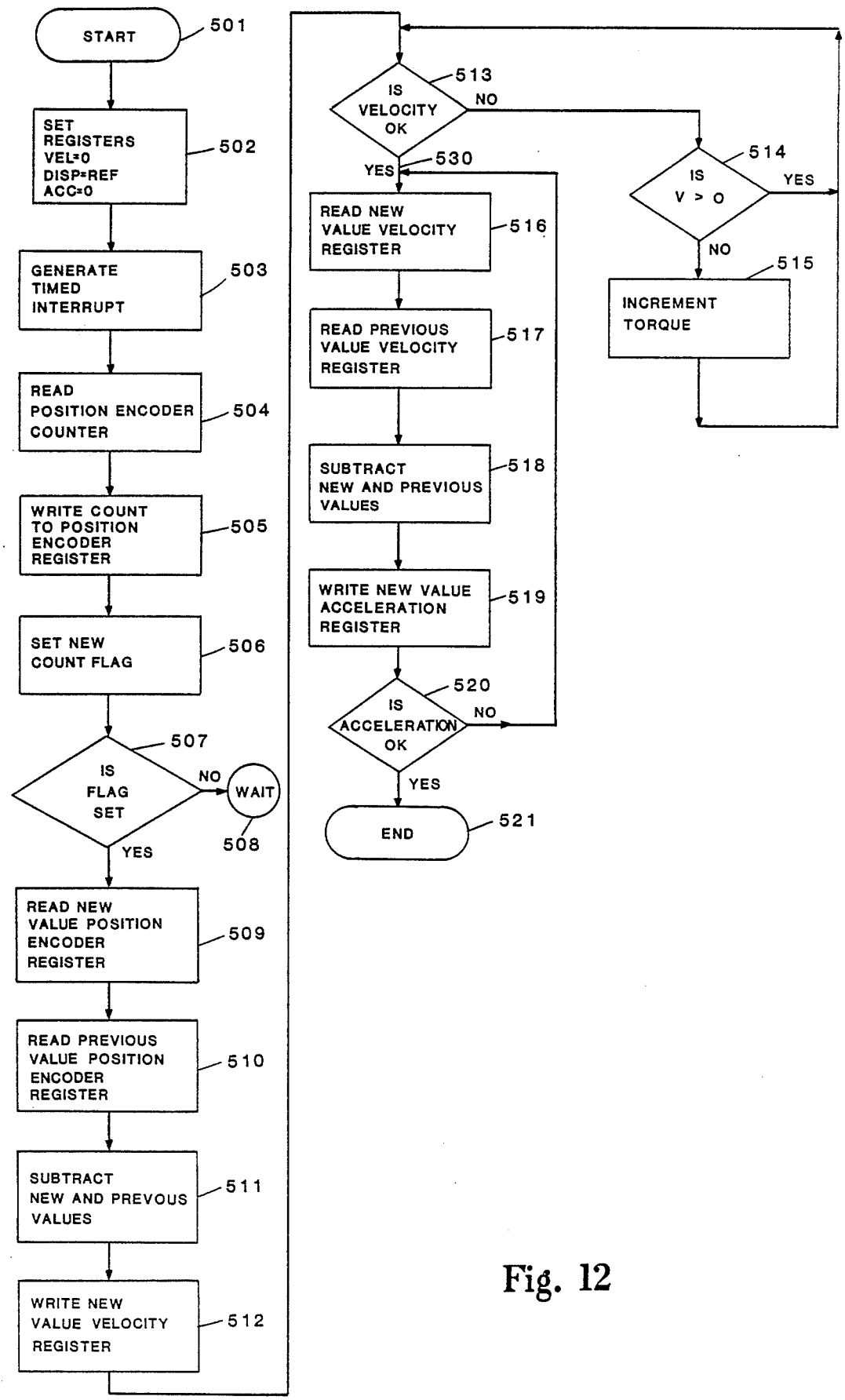
FIG. 12 is a flowchart illustrating the manner in which velocity and acceleration are determined in the system of the present invention.

There is shown in FIG. 12 a flowchart illustrating the manner in which the programming of the system of the present invention calculates velocity and acceleration values so as to be able to calculate unknown forces opposing the rotation of the shaft of the motor of the system. As shown in FIG. 12, the system starts at 501 and at 502 the system initializes its internal registers including setting velocity equal to zero, acceleration equal to zero, and displacement equal to some reference value which might also be zero. At 503 a timed interrupt is generated in which to perform the various reading operations. In particular, this timed interrupt at 503 may be as fast as on the order of 300 nanoseconds for the Suer Z8 microprocessor and regardless of what else the processor is doing, these interrupts are always generated. At 504 the system reads the position encoder counter and at 505 writes the count contained within the position encoder counter into a position encoder register. At 506 a new count flag is set or incremented. At 507 the system asks whether or not the flag is set yet, and if not, the system waits at 508. If the flag has been set, the system goes on to 509 at which a new value in the position encoder register is read. At 510 the previous value of the position encoder register is read and at 511 the new and previous values of subtracted and an encoder displacement value change as a function of time is calculated as velocity. At 512 the new value of velocity just calculated from the difference between the encoder displacement charge per unit of time elapsed is written into the velocity register. At 513 the system tests whether or not the velocity value recorded is okay or not. That is, at this step the system is asking whether or not the shaft is moving. If not, the system asks at 514 whether the velocity is greater than zero. If not, torque is incremented at 515 and the system returns to 513 to check the velocity again. If it so happens that the velocity is not greater than zero at 514, then the system also goes back and checks the velocity again at 513 until it gets a yes.

After the velocity has been checked to be okay at 513, the system continues to calculate successive values of velocity and reads at 516 a new value from a velocity register and at 517 reads the previous value in the velocity register. At 518 the new and previous values of velocity are subtracted and, by means of the change in velocity per unit time, an acceleration value is calculated. At 519 a new value of acceleration is written into the register. At 520 the system checks whether or not the calculated value of acceleration is okay by comparing it to an arbitrary preset value to ensure that the value determined is within some reasonable range of values. If not, the system returns to 516 and beings the acceleration calculation subroutine again. If the acceleration is determined to be okay at 520 the program ends at 521.

Calibration and Measurement Determination Procedures

A calibration procedure is needed in the system of the present invention because of several non-linear second order effects which affect both the value of the current and the forces produced by the current. For example, the burden resistance in the motor driver circuit which sets the current has a finite tolerances, as does the voltage reference in the pulse width modulator control chip. In addition, the torque constant (K) of each electric motor will vary somewhat from motor to motor, the digital-to-analog converters (used as digitally controlled voltage dividers) in the feedback loop have finite tolerances, and the RMS value of the current changes somewhat as the current slope changes. These and other variable parameters within each system of the present invention requires that a procedure be used to calibrate the system.

The system force values may be calibrated in a static manner by affixing the driveshaft of the electric actuator to a device which accurately measures the static torque of the driveshaft for varying values of motor current. This procedure is done for each force number output by the microprocessor and, thus, assigns a specific value of force to each binary number used to control the digitally controlled current regulator. In this calibration procedure, the force values may be read by hand, and then manually input into the computer or they may be electronically read and directly input into the computer by electronic means.

A dynamic calibration procedure may also be used to determine a value of torque for each binary number output by the process control computer to the digitally controlled current source and, thus, to calibrate the system. This procedure is based upon Newton's Second Law of dynamics, F=MA, and consists of five steps:

1. The mass of the rotor and the driveshaft of the motor, as well as the frictional resistance of the shaft bearings are dynamically determined.

2. Once the mass is determined by step 1, the force can be determined by measuring the acceleration using the equation Force=Mass×Acceleration.

3 Once force is determined by using step 2, additional unknown masses can be determined by measuring acceleration and then determining the total mass of the system and subtracting the known mass therefrom using the value of force determined in step 2.

4. Once the total masses fixed to the driveshaft are known by using step 3, the additional forces opposing or resisting the movement of the driveshaft may be measured by measuring the acceleration. Acceleration and mass are both known and, therefore, the total forces must be the product of these two values. The total effective force on the driveshaft is the sum of the known motor force, set by the process control computer, and the unknown forces, affecting movement of the driveshaft. By subtracting the known force from the total force, the unknown force is determined.

5. By setting the acceleration equal to zero, the inertial forces caused by the total mass are eliminated and only the external forces such as friction resistance, or forces developed by the load, affect the acceleration.

This fact allows determination of the bearing resistance force and subtracting this force value from the known force developed by the motor, thus allowing complete determination of motor and driveshaft inertia, as well as friction forces opposing rotation of the shaft.

By using combinations of steps 3, 4 and 5, unknown masses and/or unknown forces affecting the movement of the driveshaft can be completely determined quickly and accurately, with no external measurement devices being used to determine current, mass or force.

By increasing the number of digital bits which set the value of the current produced by the digitally controlled current source, and thus set the motor torque, the angular resolution of the encoder and the frequency and accuracy of the clock, the system accuracy may be increased to any level required for a particular application. Since the system is binary in nature, the acceleration cannot be set to absolute zero, and some deviation from this value, which is determined by the required accuracy of the system must be allowed. The value of acceleration and/or velocity may also contain small errors due to the binary nature of the system. These errors can be reduced by averaging a number of samples, and using this averaged value as the value of acceleration. Many different averaging techniques can be used to accomplish this goal, depending upon the needs of the individual application.

A more detailed explanation of the calibration procedure of step 1, set forth briefly above, is as follows:

A preselected binary number is input to the digitally controlled current regulator connected to the motor with no load affixed to the driveshaft of the motor. This binary number is recorded and the acceleration computed and stored in the memory of the process control computer. Next, a calibrated, known mass is affixed to the driveshaft and the same binary number read into the digitally controlled current source. A new value of acceleration is then computed with the known mass affixed. Since the two binary numbers and thus the two set forces are equal, the mass-acceleration product of each must also be equal, because if two equations are equal to the same constant, they are equal to each other.

Since the two equations are equal, the mass of the shaft and rotor (M1) times the first value of acceleration must equal the sum of the calibrated weight (M2) plus M1 times the second value of acceleration ($M1 \times A1 = (M1+M2) \times (A2)$). Rearranging terms M1, (which is the heretofore unknown mass of the shaft and rotor), equals M2 (which is the calibrated weight), times A2 (the second value of acceleration) divided by A1 minus A2 (the algebraic difference in accelerations) ($M1 = A2 \times M2/(A1-A2)$). This allows an accurate determination of the mass of the motor shaft and rotor, putting this now known value of mass into the equation force = mass (M1) × acceleration (A1) allows complete determination of the force output by the motor for that binary number, since both mass and acceleration are completely determined.

This initial value of mass, as calculated above, is then used in conjunction with a calculated value of acceleration to establish a calibrated level of force for the particular binary number used. The process is repeated for each binary number employed by the process control computer in setting current values from the digitally programmable current source.

Using the equation $F_{total} = MA$, and once M and A are completely determined using the above procedure, $F_{total}$ is known. By setting A=0, the inertia force of the rotating member is zero and the value of $F_{total}$ equals the frictional resistance forces of the bearings.

Alternatively, to avoid measuring each value of current and force for each binary number, once the first value of force is precisely determined, the remaining values of force can be determined by linear ratio derived from this calibrated force level.

Once a table relating a binary number to a level of force at a given velocity is obtained, and the inertia force of the rotating parts of the motor is known, varying the current to obtain a preselected value of acceleration allows determination of unknown masses affixed to the driveshaft.

Since acceleration and force are known using Newton's equation, F=MA, the value of the unknown mass can be determined by this method. By storing this value of mass in the process control computer, and normalizing the value of mass to one, the simplified equation then reads F=A. As values of A and F are recorded, the stored value of mass can be used by the process control computer to calculate the true value of force.

$F_{total}$ is the algebraic sum of the known calibrated force determined by the binary number output to the digitally controlled current regulator, that is $F_{set}$, the set force, plus the unknown forces, $F_{unknown}$, which equal acceleration if the mass is normalized to one, i.e. F=A. Since A is determined by the procedure described above, and $F_{set}$ can be determined from the look-up table obtained by the procedure also described above, the difference, $F_{unknown}$, can be easily determined by subtracting $F_{set}$ from $P_{total}$, thus allowing complete determination of the forces opposing or resisting the rotation of a driveshaft of the motor.

Software

The calibration procedure described above consists of a group of software subroutines which can be sequentially called from memory to either calibrate or operate the system.

These subroutines consist of a general subroutine which calls the value of torque and reads encoder counts and direction to calculate and record either velocity, acceleration, or both. this subroutine is shown and described above as FIG. 12. A second subroutine of FIG. 13, sets acceleration and varies torque to obtain a preselected acceleration value. The second subroutine of FIG. 13 utilizes the first subroutine of FIG. 12, or parts thereof, to accomplish its task. A third subroutine (not specifically shown) sets velocity and varies torque to obtain a selected velocity. The third velocity set subroutine is virtually identical to the second acceleration set subroutine of FIG. 13 except that only velocity values are calculated instead of continuing on to calculate acceleration values.

Additional programs utilizing these three subroutines may determine either unknown masses or unknown forces, depending upon which combination of subroutines is used.

Referrng back to the flowchart of FIG. 12, this program contains several subroutines which allow both velocity and acceleration to be determined separately or in combination. The program starts at 502 by setting initial conditions of velocity and acceleration to zero, although if appropriate, parameters other than zero can be set in these registers. Next, at 503 the program generates a high priority timed interrupt, which takes preference over all other activities of the processor. When this interrupt occurs, the program exists to a subroutine which reads the encoder counter at 504, stores the values in a register at 505, and sets a new count flag at 506. It then returns to the main program, which checks to see if a new count flag is set at 507, and may go into a wait state at 508 until the flag is set by the timed interrupt. Once the new count flag is set, the program exists to the subroutine for calculating velocity at 509. This subroutine reads the encoder register at 509, and then the velocity register at 510, subtracts one from the other at 511 and stores the new value in the velocity register at 512. It then returns to the main program, which performs a check to determine if the velocity is okay at 513. If the velocity is okay, the program may either end at 530 or continue on to call an acceleration calculation subroutine. This acceleration calculation subroutine which begins at 530 reads the new velocity value at 516 and the old velocity value, subtracts the two at 518, and writes the value to the acceleration register at 519. The program then checks to see if the acceleration value is within a prescribed tolerance at 520. If so, the program returns to the main sequence and, if not, the program returns to 530 to recalculate acceleration and disregards the previous value.

Figure 13:
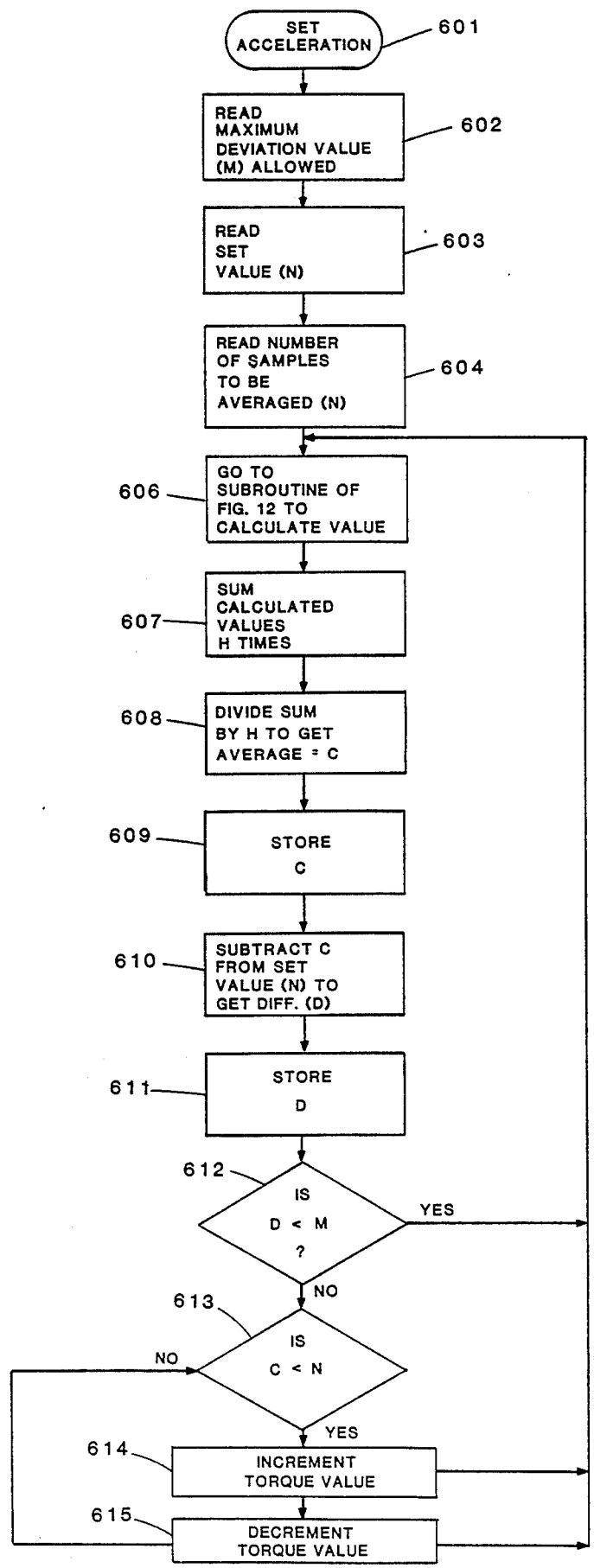
FIG. 13 is a flowchart illustrating the manner in which the system of the present invention sets acceleration and velocity.

The set acceleration/velocity subroutines of FIG. 13 begins at 601 and at 602 and reads from memory a preselected value M. This value is the maximum permissible deviation of either acceleration or velocity, whichever is being set by the subroutine, from the selected value N, which is the desired value of acceleration or velocity being set by the subroutine. Only accelerations will be discussed below, however, the steps apply equally to setting velocity as should be clear from the flowchart itself.

Sometimes it is desirable to average the value of acceleration over a number of counts. The value H is the number of counts to be averaged. If no averaging techniques are needed, H=1. Next the program calls the routine which determines acceleration as described above.

After reading in the value of M from memory at 602, the system reads in values of N at 603 and H at 604. At 606 the routine of FIG. 13 calls in the routine of FIG. 12 to repeatedly calculate acceleration values, H times. These H values are added at 607, divided by H at 608 to obtain C, the averaged value of acceleration. C is stored in memory at 609.

The program then subtracts C from the wanted acceleration value, N at 610, and stores the difference between N and C as the value D at 611. At 612 the program checks to see if the value D is less than the allotted difference M. If this is true, the program moves back to obtain another averaged value of acceleration, C. If false, it then checks to see if C is less than M at 613. If C is less than M at 613, it increments the motor torque value at 614 and loops back to 606 to obtain a new value of C. If not, the program decrements the torque value at 615, and then loops back to obtain a new value of C at 606.

The set velocity subroutine is virtually identical to the set acceleration subroutine specifically illustrated in FIG. 13 except that only velocity is calculated instead of continuing on to calculate the acceleration value. The subroutines discussed above can be arranged to calibrate or run the system. A calibration routine can be set up as follows:

1. With no load to the motor shaft, set the torque and measure acceleration;
2. Input the mass of a known load to memory;
3. Affix this mass to the driveshaft;
4. Recall the above value of torque which was set and record a new value of acceleration with the known mass;
5. Subtract the known mass acceleration value from the no load acceleration value, and store this value of acceleration difference in this memory;
6. Multiply the second value of accleration by the calibrated mass. Divide this value by the acceleration difference obtained in step 5 to determine the heretofore unknown mass of the shaft and rotor. Multiple the now known mass by the first value of acceleration to obtain a calibrated force. Store this value of calibrated force in computer memory;
7. Set the acceleration value to zero for selected velocities. The force value obtained when the acceleration is zero is the value of the bearing resistance, which varies as a function of velocity, with each value of bearing resistance obtained as a function of velocity being stored in a table for force calibrations;
8. With a known mass, record acceleration for each value of binary number output by the computer and thus each value of set current and set forth used in the motor. Multiply acceleration by mass to obtain a force value for each binary member and store in a force number table;
9. Using the calculated force number table and the bearing friction velocity table, obtain a corrected force value for each binary number output by the computer;
10. Obtain a value of force and determine unknown masses by dividing force obtained in step 9 by acceleration; and
11. Multiply the known mass by the measured acceleration to determine the total forces acting on the driveshaft.

As it can be seen, the various embodiments of the present invention overcome any of the shortcomings of the prior art variable force and measurement and control systems. It is thus believed that the construction and operation of the present invention will be apparent from the foregoing description. While the system shown described has been characterized as being preferred and in multiple embodiments, it will be obvious that various changes and modifications may be made therein without departing from the spirit and scope of the invention as defined in the following claims.

What is claimed is:

1. A system for providing program controlled force in an apparatus, comprising:
   a driveshaft adapted for engagement with a load to perform a function by moving said driveshaft against said load;
   a direct current electric motor having an actuator connected to said driveshaft, said motor being operable in the current mode to control the force applied to the actuator thereof by varying the current through the windings;
   means mounted to said motor actuator for movement therewith for providing an output signal indicative of the position of said actuator with respect to a reference position;
   a clock for providing timing signals;
   an electrical power source;
   current regulator means connected between said power source and the windings of said motor; and
   processor means responsive to said output signals and to signals from said clock for controlling the output of said regulator and varying the current through the windings of said motor to provide a preprogrammed value of force exerted by the actuator of said motor and, thereby, the force exerted by said driveshaft against said load.

2. A system for providing program controlled force in an apparatus as set forth in claim 1, wherein said output signal providing means includes:
   optical encoder means mounted to the actuator of said electric motor for rotation therewith;
   means responsive to movement of said encoder for producing a train of output pulse patterns; and
   a counter means connected to said output pulse pattern producing means for maintaining a value indicative of the direction and displacement of said actuator.

3. A system for providing program controlled force in an apparatus as set forth in claim 1, wherein said processor means includes:
   a process control microcomputer;
   means for setting the current flow direction and value through the windings of said electric motor;
   means responsive to said microcomputer for storing a desired value of current flow direction and value through said motor windings; and
   said current mode regulator including current flow monitoring means and being responsive to the value stored in said storing means for changing the current flow direction and value in said winding.

4. An improved variable force exerting system of the type which includes a force exerting member adapted for engagement with a load to effect movement thereof, means for connecting the force exerting member to the driveshaft of a DC motor in which the torque thereof is controlled by the current through the windings, wherein the improvement comprises:
   a current mode power supply connected to the windings of said DC motor, said power supply having means for controlling the positive and negative current produced thereby to change the direction and value of the current flow through the motor windings and vary the torque thereof and thereby change the force applied by the driveshaft to the force exerting member to effect movement of the load.

5. An improved variable force exerting system as set forth in claim 4, wherein the improvement further comprises:
   a program controlled processor responsive to the position of the driveshaft and to a stored program for controlling the current produced by said current mode power supply.

6. An improved variable force exerting system as set forth in claim 5, which also includes:
   means for monitoring the positioning of said drive shaft and producing an output signal indicative thereof;
   means for connecting said output signal to said processor and enabling the programmed control of current through windings of said DC motor in response to the position of the force exerting member being moved by the load.

7. An improved variable force exerting system as set forth in claim 5 wherein:
   said current mode power supply includes means for producing bi-directional current flow through the windings of the motor.

8. An improved variable force exerting system as set forth in claim 7 wherein:
said current mode power supply includes means for varying the feedback compensation in response to varying operating conditions to optimize performance of the regulator.

9. A method for determining the value of an unknown force of a load opposing movement of the driveshaft of an electric actuator of the type in which the force applied to the driveshaft is a linear function of the current through the actuator, comprising:
   supplying current to the actuator with a current mode controlled regulator having a plurality of discrete selectable current values;
   producing signals indicative of the direction and extent of the movement of the driveshaft of the actuator;
   providing regular periodic timing pulses;
   providing a program controlled processor for receiving said driveshaft movement signals and said timing pulses;
   periodically calculating with said processor the acceleration of the driveshaft from said driveshaft movement signals and said timing pulses;
   calibrating the actuator by calculating driveshaft acceleration values with no load and a known load for a plurality of discrete current values being supplied to the actuator to determine the force applied to a load by the driveshaft of the actuator for each of said discrete selectable current values from the regulator; and
   controlling said current regulator with said processor to vary the current supplied by the regulator to the actuator with the unknown load connected to the driveshaft thereof until the acceleration of the driveshaft is about zero and determining the value of the unknown force from the current value at that point.

10. A method for determining the value of an unknown load force opposing movement of the driveshaft of an electric actuator as set forth in claim 9 wherein said current varying step includes:
   repeatedly setting a current value to be supplied to the actuator by the regulator and calculating the acceleration of the driveshaft; and
   setting successive current values which tend to cause the calculated driveshaft acceleration values to change in a direction toward zero.

11. A method for determining the value of an unknown force of a load opposing movement of the driveshaft of an electric actuator of the type in which the force applied to the driveshaft is a linear function of the current through the actuator, comprising:
   supplying current to the actuator with a current mode controlled regulator having a plurality of discrete selectable current values;
   producing signals indicative of the direction and extent of the movement of the driveshaft of the actuator;
   providing regular periodic timing pulses;
   periodically calculating from said driveshaft movement signals and said timing pulses the acceleration of the driveshaft;
   calibrating the actuator by calculating driveshaft acceleration values with a known load for a plurality of discrete motor temperature values with a selected current value being supplied to the actuator to determine the force applied to said known load by the driveshaft of the actuator for each of said discrete temperature values; and varying the current supplied by the regulator to the actuator with the unknown load connected to the driveshaft thereof until the acceleration of the driveshaft is about zero and determining the value of the unknown force from the current value at that point.

12. A method for determining the value of an unknown mass attached to the driveshaft of an electric actuator of the type in which the force applied to the driveshaft is a linear function of the current through the actuator, comprising:
supplying current to the actuator with a current mode controlled regulator having a plurality of discrete selectable current values;
producing signals indicative of the direction and extent of the movement of the driveshaft of the actuator;
providing regular periodic timing pulses;
providing a program controlled processor for receiving said driveshaft movement signals and said timing pulses;
periodically calculating with said processor the acceleration of the driveshaft from said driveshaft movement signals and said timing pulses;
calibrating the actuator by calculating driveshaft acceleration values with no load and a known load for a plurality of discrete current values being supplied to the actuator to determine the force applied to a load by the driveshaft of the actuator for each of said discrete selectable current values from the regulator;
setting a selected value of current supplied by the regulator to the actuator with the unknown mass connected to the driveshaft thereof and measuring the acceleration of the driveshaft; and
calculating the unknown mass from the measured value of acceleration and the force value applied to the shaft at the selected value of current set to be supplied by the regulator to the actuator.

13. A method for determining the value of an unknown mass attached to the driveshaft of an electric actuator as set forth in claim 12 which also includes:
controlling said current regulator with said processor to vary the current delivered to the actuator in accordance with said calculations.

14. A method for determining the value of unknown mass attached to the driveshaft of an electric actuator as set forth in claim 13 wherein said current varying step includes:
repeatedly setting a current value to be supplied to the actuator by the regulator and calculating the acceleration of the driveshaft; and
setting successive current values which tend to cause the calculated driveshaft acceleration values to change in a direction toward zero.

15. A method for determining the value of an unknown mass attached to the driveshaft of an electric actuator as set forth in claim 12 wherein said step of supplying current to the actuator comprises:
providing a switch mode regulator.

16. A system for controlling the force applied to a load comprising:
an electric actuator having a driveshaft connected to the load;
encoder means for producing signals indicative of the direction and incremental value of movements in the driveshaft of said actuator;
means for producing discrete selectable values of current connected to said actuator to produce a force on the driveshaft thereof proportional to the current value supplied;
digital program controlled processor means connected to said encoder means for receiving signals therefrom and calculating values of driveshaft velocity and acceleration from incremental movement as a function of time and connected to said current producing means to select values of current based upon said calculated driveshaft velocity and acceleration values to control the force applied to the load by the driveshaft.

17. A system for controlling the force applied to a load as set forth in claim 16 which also includes:
a host computer connected to said processor means for providing additional storage and control therefor.

18. A system for controlling the force applied to a load as set forth in claim 16 wherein said electric actuator comprises an electric motor having a rotating output driveshaft.

19. A system for controlling the force applied to a load as set forth in claim 18 wherein said encoder means also includes:
means for producing a series of pulses the number of which indicates the incremental value of angular displacement of the driveshaft, and means for producing a single pulse the presence of which indicates rotation of the driveshaft in a selected direction.

20. A system for controlling the force applied to a load as set forth in claim 18 wherein said encoder means comprises:
optical encoder means mounted to the driveshaft of said electric motor for rotation therewith;
means responsive to movement of said encoder for producing a train of output pulse patterns; and
a counter means connected to said output pulse pattern producing means for maintaining a value indicative of the angular position of said driveshaft.

21. A system for controlling the force applied to a load as set forth in claim 16 wherein said current producing means includes:
a current source;
means for switching the polarity of an input current connected to supply current to said electric actuator;
a pass element connected between said current source and said switching means for regulating the current supplied to the actuator;
means connected to said pass element for controlling the value of current supplied from the source to the switching means;
means for connecting the processor means to said control means and to said switching means to enable signals from said processor to select the value and polarity of current supplied from said source to said actuator.

22. A system for controlling the force applied to a load as set forth in claim 21 wherein said control means for said pass element includes:
a current mode control circuit;
means responsive to the voltage value being supplied to said actuator for providing a voltage feedback signal to said control circuit;

means responsive to the current value being supplied to said actuator for providing a current feedback signal to said control circuit; and means for connecting said voltage and current feedback signal providing means to said processor for enabling said processor to said feedback signals.

23. A system for controlling the force applied to a load as set forth in claim 22 which also includes:

means responsive to the operating conditions of said actuator and to said processor for varying the combination to optimize the performance of the actuator.

24. A system for providing program controlled force in an apparatus, comprising:

a driveshaft adapted for engagement with a load to perform a function by moving said driveshaft against said load;

a direct current electric motor having an actuator connected to said driveshaft, said motor having operable in the current mode to control the force applied to the actuator thereof by varying the current through the windings;

means mounted to said motor actuator for movement therewith for providing an output signal indicative of the angular acceleration thereof;

an electrical power source;

current regulator means connected between said power source and the windings of said motor; and processor means responsive to said output signals for controlling the output of said regulator and varying the current through the windings of said motor to provide a preprogrammed value of force exerted by the actuator of said motor and, thereby, the force exerted by said driveshaft against said load.

25. A system for providing programmed force in an apparatus as set forth in claim 24, wherein said processor means includes:

a process control microcomputer;

means for setting the current flow direction and value through the windings of said electric motor;

means responsive to said micrcomputer for storing a desired value of current flow direction and value through said motor windings; and said current mode regulator including current flow monitoring means and being responsive to the value stored in said storing means for changing the current flow direction and value in said winding.

* * * * *